United States Patent
Gao et al.

(10) Patent No.: US 11,563,452 B2
(45) Date of Patent: Jan. 24, 2023

(54) RADIO FREQUENCY TRANSMITTER AND SIGNAL PROCESSING METHOD

(71) Applicant: Huawei Technologies Co., Ltd., Shenzhen (CN)

(72) Inventors: Peng Gao, Shanghai (CN); Min Yi, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 133 days.

(21) Appl. No.: 17/104,732

(22) Filed: Nov. 25, 2020

(65) Prior Publication Data
US 2021/0083699 A1 Mar. 18, 2021

Related U.S. Application Data

(63) Continuation of application No. PCT/CN2018/089409, filed on May 31, 2018.

(51) Int. Cl.
*H04B 1/04* (2006.01)
*H04L 27/12* (2006.01)

(52) U.S. Cl.
CPC .......... *H04B 1/0475* (2013.01); *H04L 27/12* (2013.01); *H04B 2001/0416* (2013.01)

(58) Field of Classification Search
CPC ......... H04B 1/0475; H04B 2001/0416; H04B 1/40; H04B 1/16; H04B 1/30;
(Continued)

(56) References Cited

U.S. PATENT DOCUMENTS

| 9,379,727 B1* | 6/2016 | Seo ...................... H03M 1/0845 |
| 2003/0138034 A1* | 7/2003 | Shi ....................... H03G 3/3042 |
| | | 375/344 |

(Continued)

FOREIGN PATENT DOCUMENTS

| CN | 1367626 A | 9/2002 |
| CN | 1579048 A | 2/2005 |

(Continued)

OTHER PUBLICATIONS

Guangdong Oppo Mobile Telecom, "On symbol-level time-domain resource allocation", 3GPP TSG RAN WG1 meeting #89, R1-1707726, Hangzhou, P.R. China, May 15-19, 2017, 7 pages.

(Continued)

*Primary Examiner* — Lana N Le
(74) *Attorney, Agent, or Firm* — Slater Matsil, LLP

(57) ABSTRACT

A radio frequency transmitter includes a digital-to-analog converter, an analog baseband processor, and a modulator. The digital-to-analog converter is configured to convert a digital frequency-converted signal into a first analog signal, where the digital frequency-converted signal is obtained by performing digital frequency conversion on a digital baseband signal based on a first frequency signal; the analog baseband processor is configured to perform filtering and gain adjustment on the first analog signal to obtain a second analog signal; and the modulator is configured to perform up conversion based on a second frequency signal and the second analog signal, to obtain a radio frequency signal, where the second frequency signal is determined based on a local frequency signal and the first frequency signal.

17 Claims, 10 Drawing Sheets

(58) Field of Classification Search
CPC .......... H04B 1/406; H04B 7/06; H04L 27/12; H04L 25/49; H04L 5/06; H04L 27/2627; H04L 27/362; H04L 27/10; H04L 27/2626; H04L 2027/0032; H04L 27/0002; H04L 27/122

See application file for complete search history.

(56) References Cited

U.S. PATENT DOCUMENTS

| | | | |
|---|---|---|---|
| 2004/0248526 A1 | 12/2004 | Narita et al. | |
| 2006/0062279 A1* | 3/2006 | Liu | H04L 27/2647 375/E1.034 |
| 2007/0111682 A1 | 5/2007 | Mucke | |
| 2009/0279588 A1* | 11/2009 | Mochizuki | H04L 27/2647 375/E1.037 |
| 2011/0051790 A1* | 3/2011 | Honda | H04B 17/21 455/296 |
| 2014/0169348 A1* | 6/2014 | Hassan | H04L 45/026 375/296 |
| 2014/0314175 A1 | 10/2014 | Nilsson | |
| 2015/0103952 A1* | 4/2015 | Wang | H04B 1/0475 375/297 |
| 2017/0085281 A1* | 3/2017 | Dou | H04B 1/0475 |
| 2018/0252807 A1* | 9/2018 | Fox | G01S 13/90 |

FOREIGN PATENT DOCUMENTS

| | | | |
|---|---|---|---|
| CN | 1622467 A | 6/2005 | |
| CN | 101227212 A | 7/2008 | |
| CN | 101453226 A | 6/2009 | |
| CN | 104617963 A | 5/2015 | |
| WO | WO-2017054658 A1 * | 4/2017 | ............. H04B 1/005 |

OTHER PUBLICATIONS

Guangdong Oppo Mobile Telecom et al., "Discussion on CBG-based transmission", 3GPP TSG RAN WG1 Meeting #89, R1-1707725, Hangzhou, P.R. China, May 15-19, 2017, 3 pages.

* cited by examiner

US 11,563,452 B2

RADIO FREQUENCY TRANSMITTER AND SIGNAL PROCESSING METHOD

CROSS-REFERENCE TO RELATED APPLICATIONS

This application is a continuation of International Application No. PCT/CN2018/089409, filed on May 31, 2018, which is hereby incorporated by reference in its entirety.

TECHNICAL FIELD

This application relates to the communications field, and more specifically, to a radio frequency transmitter and a signal processing method.

BACKGROUND

In wireless communications technologies, a communications device may send and receive a signal through a radio frequency transceiver. In a signal sending process, the communications device may sequentially perform digital baseband signal processing, digital-to-analog conversion processing, up-conversion processing, and the like on a to-be-transmitted signal, to generate a to-be-transmitted radio frequency signal.

However, when the signal is processed on the radio frequency transceiver, some nonlinear distortion may be caused due to feature limitations of components, such as noise and nonlinearity. For example, due to third-order nonlinear distortion of a digital-to-analog converter and an analog baseband processor, a new third-order harmonic is generated before up conversion is performed on the signal. After up conversion is performed on the third-order harmonic together with the signal, an up-converted third-order harmonic is moved onto a radio frequency band. If the third-order harmonic moved onto the radio frequency band falls onto a system-defined guard band, interference may be caused to another user or system, or a standard limit of spurious emission is exceeded.

In some communications systems, for example, a long term evolution (LTE) system and a 5th generation (5G) mobile communications system, a network device may dynamically schedule a physical uplink resource for a terminal device to use. For example, when a traffic volume is comparatively large, a comparatively large bandwidth resource may be scheduled; or when a traffic volume is comparatively small, a comparatively small bandwidth resource may be scheduled. When a bandwidth of the physical uplink resource scheduled by the network device for the terminal device changes, for example, when the bandwidth is switched from a full resource block to a single resource block (RB), because a transmit power remains unchanged but the bandwidth is reduced, energy is more concentrated on a frequency spectrum. In this case, interference caused by the third-order harmonic that falls onto the guard band is excessively severe, and signal receiving quality of another user or system is severely affected.

SUMMARY

This application provides a radio frequency transmitter and a signal processing method, to prevent a distortion signal from falling onto a guard band, and help reduce communication interference caused by the distortion signal to another user or system.

According to a first aspect, a radio frequency transmitter is provided. The radio frequency transmitter includes a digital-to-analog converter, an analog baseband processor, and a modulator. The digital-to-analog converter is configured to convert a digital frequency-converted signal into a first analog signal, where the digital frequency-converted signal is obtained by performing digital frequency conversion on a digital baseband signal based on a first frequency signal. The analog baseband processor is configured to perform processing such as filtering and gain adjustment on the first analog signal to obtain a second analog signal. The modulator is configured to perform up conversion on the second analog signal based on a second frequency signal to obtain a radio frequency signal, where the second frequency signal is determined based on a local frequency signal and the first frequency signal.

Based on the foregoing design, the radio frequency transmitter provided in this application can perform frequency conversion processing on the digital baseband signal in a digital signal processing process, to compensate for some analog-domain frequency conversion, so that an analog-domain modulation frequency changes. In this way, a distortion signal that originally falls onto a guard band can be moved out from the guard band, and interference caused by the distortion signal to another user or system is reduced.

The second frequency signal may be related to the local frequency signal and the first frequency signal. Specifically, if the digital frequency-converted signal is obtained by performing up conversion on the digital baseband signal based on the first frequency signal, the second frequency signal is a difference between a frequency of the local frequency signal and a frequency of the first frequency signal; or if the digital frequency-converted signal is obtained by performing down conversion on the digital baseband signal based on the first frequency signal, the second frequency signal is a sum of a frequency of the local frequency signal and a frequency of the first frequency signal.

It should be noted that, because precision of components is different, for the descriptions that "the second frequency signal is a difference between a frequency of the local frequency signal and a frequency of the first frequency signal" and "the second frequency signal is a sum of a frequency of the local frequency signal and a frequency of the first frequency signal", there may be a deviation for the sum or the difference. A person skilled in the art may understand that the deviation may be ignored or allowed. That is, the second frequency signal is approximately equal to the difference between the frequency of the local frequency signal and the frequency of the first frequency signal, or the second frequency signal is approximately equal to the sum of the frequency of the local frequency signal and the frequency of the first frequency signal. For brevity, descriptions about a same case or similar cases are omitted in the following description.

With reference to the first aspect, in some possible implementations, the first frequency signal is set based on an expected frequency point of the radio frequency signal, a center frequency point of the digital baseband signal, and a guard band that corresponds to a scheduled first frequency domain resource.

The scheduled first frequency domain resource may be a scheduled frequency domain resource in a communications system, for example, the scheduled first frequency domain resource may be a frequency domain resource scheduled by a network device for a terminal device to use. If frequency bands to which the first frequency domain resource belongs are different, corresponding guard bands, expected frequency points of the radio frequency signal, and center frequency points of the digital baseband signal may be all different.

Therefore, the first frequency signal may change with the scheduled first frequency domain resource, and the second frequency signal that is determined based on the first frequency domain signal and the local frequency signal may also change with the scheduled first frequency domain resource. In other words, a modulation frequency used for performing up conversion on the second analog signal may dynamically change with a scheduled frequency domain resource.

With reference to the first aspect, in some possible implementations, the radio frequency transmitter further includes a controller, where the controller is configured to determine and output the first frequency signal.

Specifically, the controller may determine the first frequency signal based on the expected frequency point of the radio frequency signal, the center frequency point of the digital baseband signal, and the guard band that corresponds to the scheduled first frequency domain resource that are described above.

With reference to the first aspect, in some possible implementations, when determining the first frequency signal, the controller is specifically configured to: when a center frequency point of a first distortion signal falls onto the guard band and a transmit power of the first distortion signal is greater than or equal to a preset threshold, determine the first frequency signal, to enable a second distortion signal not to cause interference to the guard band.

Herein, the first distortion signal may indicate nonlinear distortion caused after the digital baseband signal is directly processed by the digital-to-analog converter and the analog baseband processor, and the second distortion signal may indicate nonlinear distortion caused after the digital frequency-converted signal is processed by the digital-to-analog converter and the analog baseband processor.

Therefore, the controller determines the first frequency signal when digital frequency conversion needs to be performed on the digital baseband signal.

With reference to the first aspect, in some possible implementations, the second distortion signal includes a count third-order intermodulation CIM3 distortion signal generated based on a third-order harmonic, and a center frequency point $f_1$ of the first frequency signal satisfies: $f_1 > (f_{RF} - f_a)/4 - f_{BB}$; or $f_1 < (f_{RF} - f_b)/4 - f_{BB}$, where $f_a$ represents a minimum frequency of the guard band, $f_b$ represents a maximum frequency of the guard band, $f_{RF}$ represents the expected frequency point of the radio frequency signal, and $f_{BB}$ represents the center frequency point of the digital baseband signal.

It should be understood that both the first distortion signal and the second distortion signal may be third-order intermodulation distortion signals. In this embodiment of this application, the third-order intermodulation distortion signal is merely used as an example to describe a relationship between the first frequency signal and the following information: the guard band, the expected frequency point of the radio frequency signal, and the center frequency point of the digital baseband signal. However, this should not constitute any limitation on this application. When the distortion signal is another high-order intermodulation distortion signal, the first frequency signal may be determined according to the foregoing same method.

With reference to the first aspect, in some possible implementations, the radio frequency transmitter further includes a digital baseband processor and a digital frequency converter. The digital baseband processor is configured to generate the digital baseband signal. The digital frequency converter is configured to perform digital frequency conversion on the digital baseband signal based on the first frequency signal, to obtain the digital frequency-converted signal.

The digital frequency converter may receive a value, output by the controller, of the first frequency signal, and perform digital frequency conversion on the digital baseband signal based on the first frequency signal. The digital frequency conversion may be up conversion or down conversion. This is not limited in this application.

With reference to the first aspect, in some possible implementations, the local frequency signal includes a first local frequency signal and a second local frequency signal, and the modulator includes a first frequency mixer and a second frequency mixer. The first frequency mixer is configured to perform up conversion on the second analog signal based on the first local frequency signal to obtain a first up-converted signal. The second frequency mixer is configured to perform up conversion on the first up-converted signal based on the second frequency signal to obtain the radio frequency signal. Herein, the first local frequency signal corresponds to the first frequency mixer, the second local frequency signal corresponds to the second frequency mixer, and the second frequency signal is determined based on a frequency of the second local frequency signal and the frequency of the first frequency signal. Specifically, if the digital frequency conversion is up conversion, the second frequency signal may be a difference between the frequency of the second local frequency signal and the frequency of the first frequency signal; or if the digital frequency conversion is down conversion, the second frequency signal may be a sum of the frequency of the second local frequency signal and the frequency of the first frequency signal.

With reference to the first aspect, in some possible implementations, the local frequency signal includes a first local frequency signal and a second local frequency signal, and the modulator includes a first frequency mixer and a second frequency mixer. The first frequency mixer is configured to perform up conversion on the second analog signal based on the second frequency signal to obtain a second up-converted signal. The second frequency mixer is configured to perform up conversion on the second up-converted signal based on the second local frequency signal to obtain the radio frequency signal. Herein, the first local frequency signal corresponds to the first frequency mixer, the second local frequency signal corresponds to the second frequency mixer, and the second frequency signal is determined based on a frequency of the first local frequency signal and the frequency of the first frequency signal. Specifically, if the digital frequency conversion is up conversion, the second frequency signal may be a difference between the frequency of the first local frequency signal and the frequency of the first frequency signal; or if the digital frequency conversion is down conversion, the second frequency signal may be a sum of the frequency of the first local frequency signal and the frequency of the first frequency signal.

The radio frequency transmitter provided in this embodiment of this application may be a radio frequency transmitter having a zero-intermediate-frequency architecture, or a radio frequency transmitter having a superheterodyne architecture or a low intermediate-frequency architecture. This is not limited in this application. When the radio frequency transmitter is the radio frequency transmitter having a superheterodyne architecture or a low intermediate-frequency architecture, analog frequency conversion may be separately performed once on an intermediate frequency band and a radio frequency band. In this case, the up conversion performed based on the second frequency signal may occur on the intermediate frequency band, or may occur on the radio frequency band. This is not limited in this application.

With reference to the first aspect, in some possible implementations, the radio frequency transmitter further includes a fast switching phase-locked loop, where the fast switching phase-locked loop is configured to: switch from a third frequency signal to the second frequency signal, and output the second frequency signal to the modulator. The third frequency signal is a frequency signal used for up conversion performed by the modulator in a previous time unit or a local frequency signal.

In this embodiment of this application, the fast switching phase-locked loop can implement fast switching in a comparatively short time, so that the modulation frequency used by the modulator to perform up conversion can be quickly switched. This is applicable to a scenario of dynamic spectrum resource scheduling in LTE or 5G.

With reference to the first aspect, in some possible implementations, the controller is further configured to determine and output a frequency control word, where the frequency control word is used to control the fast switching phase-locked loop to generate the second frequency signal.

Therefore, the controller may control, based on the frequency control word, the fast switching phase-locked loop to generate the second frequency signal corresponding to the first frequency domain resource. Because the second frequency signal is related to the first frequency signal, the frequency control word is also related to the first frequency signal.

With reference to the first aspect, in some possible implementations, there is a linear relationship between the frequency control word and the value of the first frequency signal.

In a possible design, the relationship between the frequency control word FCW and the value $f_1$ of the first frequency signal satisfies: $FCW=\alpha f_1/f_{REF}$, where $\alpha$ represents a coefficient greater than 0, and $f_{REF}$ represents a predefined value.

According to a second aspect, a radio frequency transmitter is provided. The radio frequency transmitter includes a digital-to-analog converter, an analog baseband processor, a modulator, and a fast switching phase-locked loop. The digital-to-analog converter is configured to convert a digital frequency-converted signal into a first analog signal. The analog baseband processor is configured to perform processing such as filtering and gain adjustment on the first analog signal to obtain a second analog signal. The modulator is configured to perform up conversion on the second analog signal based on a second frequency signal to obtain a radio frequency signal. The fast switching phase-locked loop is configured to switch from a third frequency signal to the second frequency signal, where the third frequency signal is a frequency signal used for up conversion in a previous time unit or a local frequency signal.

Based on the foregoing design, in a scenario of dynamic spectrum resource scheduling in a communications system, the fast switching phase-locked loop is used to implement fast switching between two adjacent time units. Therefore, when spectrum resources scheduled in different time units are different, up conversion may be performed based on different modulation frequencies, to prevent a distortion signal from falling onto a guard band when the spectrum resource dynamically changes. This helps reduce interference caused to another user or system.

With reference to the second aspect, in some possible implementations, the radio frequency transmitter further includes a digital baseband processor and a digital frequency converter. The digital baseband processor is configured to generate a digital baseband signal. The digital frequency converter is configured to perform digital frequency conversion on the digital baseband signal based on a first frequency signal to obtain the digital frequency-converted signal.

Because an analog-domain modulation frequency may change with a spectrum resource, to ensure that a frequency of a transmitted radio frequency signal remains at an expected frequency point, digital-domain frequency conversion may be performed to compensate for a change value of the modulation frequency used for analog-domain frequency conversion.

With reference to the second aspect, in some possible implementations, the radio frequency transmitter further includes a controller. The controller is configured to: determine the first frequency signal based on an expected frequency point of the radio frequency signal, a center frequency point of the digital baseband signal, and a guard band that corresponds to a scheduled first frequency domain resource; and control the digital frequency converter to perform digital frequency conversion on the digital baseband signal based on the first frequency signal.

Therefore, the first frequency signal may change with the scheduled first frequency domain resource.

With reference to the second aspect, in some possible implementations, the fast switching phase-locked loop includes: a phase detector, a loop filter, a controlled oscillator, a feedback frequency divider, and a frequency switching controller. The frequency switching controller is configured to generate a first signal, where the first signal is used to adjust a frequency division ratio of the feedback frequency divider. The feedback frequency divider is configured to obtain a feedback signal from an oscillation signal output by the controlled oscillator, and perform frequency division processing on the feedback signal under control of the first signal, to obtain a frequency-divided signal. The phase detector is configured to compare the frequency-divided signal with a reference signal, to output a control signal. The loop filter is configured to perform filtering processing on the control signal, and output the control signal on which the filtering processing has been performed. The frequency switching controller is further configured to generate a second signal, where the second signal is used to control the controlled oscillator to perform frequency switching. The controlled oscillator is configured to generate the second frequency signal under control of the second signal and the control signal on which the filtering processing has been performed.

Further, optionally, the frequency switching controller includes a sigma-delta modulator, configured to generate the first signal based on a frequency control word; and a gain compensation circuit, configured to generate the second signal based on a gain of the controlled oscillator and an expected frequency switching value, where the frequency switching value is a difference between a frequency of the second frequency signal and a frequency of the third frequency signal.

The sigma-delta modulator, the gain compensation circuit, and the controlled oscillator may be understood as a feedforward system. The phase detector, the loop filter, the controlled oscillator, the feedback frequency divider, and the sigma-delta modulator may be understood as a feedback system. With cooperation between the feedback system and the feedforward system, the fast switching phase-locked loop can implement fast switching, for example, complete frequency switching within several microseconds, and it can be ensured that a frequency of an output clock signal remains unchanged.

With reference to the second aspect, in some possible implementations, there is a linear relationship between the frequency control word and the first frequency signal.

Because the second frequency signal is related to the first frequency signal, the frequency control word is also related to the first frequency signal. In a possible design, the relationship between the frequency control word FCW and a value $f_1$ of the first frequency signal satisfies: FCW=$\alpha f_1$/$f_{REF}$, where a represents a coefficient greater than 0, and $f_{REF}$ represents a predefined value.

With reference to the second aspect, in some possible implementations, the controller is further configured to determine and output a frequency control word, where the frequency control word is used to control the fast switching phase-locked loop to generate the second frequency signal.

With reference to the second aspect, in some possible implementations, the local frequency signal includes a first local frequency signal and a second local frequency signal, and the modulator includes a first frequency mixer and a second frequency mixer. The first frequency mixer is configured to perform up conversion on the second analog signal based on the first local frequency signal to obtain a first up-converted signal. The second frequency mixer is configured to perform up conversion on the first up-converted signal based on the second frequency signal to obtain the radio frequency signal. Herein, the first local frequency signal corresponds to the first frequency mixer, the second local frequency signal corresponds to the second frequency mixer, and the second frequency signal is determined based on a frequency of the second local frequency signal and a frequency of the first frequency signal.

With reference to the second aspect, in some possible implementations, the local frequency signal includes a first local frequency signal and a second local frequency signal, and the modulator includes a first frequency mixer and a second frequency mixer. The first frequency mixer is configured to perform up conversion on the second analog signal based on the second frequency signal to obtain a second up-converted signal. The second frequency mixer is configured to perform up conversion on the second up-converted signal based on the second local frequency signal to obtain the radio frequency signal. Herein, the first local frequency signal corresponds to the first frequency mixer, the second local frequency signal corresponds to the second frequency mixer, and the second frequency signal is determined based on a frequency of the first local frequency signal and a frequency of the first frequency signal.

The radio frequency transmitter provided in this embodiment of this application may be a radio frequency transmitter having a zero-intermediate-frequency architecture, or a radio frequency transmitter having a superheterodyne architecture or a low intermediate-frequency architecture. This is not limited in this application. When the radio frequency transmitter is the radio frequency transmitter having a superheterodyne architecture or a low intermediate-frequency architecture, analog frequency conversion may be separately performed once on an intermediate frequency band and a radio frequency band. In this case, the up conversion performed based on the second frequency signal may occur on the intermediate frequency band, or may occur on the radio frequency band. This is not limited in this application.

According to a third aspect, a wireless communications apparatus is provided. The wireless communications apparatus includes the radio frequency transmitter in the first aspect or the second aspect and an antenna. The radio frequency transmitter is configured to convert a digital baseband signal into a radio frequency signal, and transmit the radio frequency signal through the antenna.

According to a fourth aspect, a signal processing method is provided. The method includes: receiving resource scheduling information in a first time unit, where the resource scheduling information is used to indicate a first frequency domain resource to be scheduled in a second time unit, and the second time unit is a next time unit of the first time unit; and based on an expected frequency point of a radio frequency signal, a center frequency point of a digital baseband signal, and a guard band that corresponds to a first frequency domain resource, determining a frequency control word and sending the frequency control word to a fast switching phase-locked loop, where the frequency control word is used to control the fast switching phase-locked loop to switch from a third frequency signal to a second frequency signal, the second frequency signal is used to perform up conversion on an analog signal in the second time unit, and the third frequency signal is a signal used to perform up conversion on the analog signal in the first time unit, or the third frequency signal is a local frequency signal.

It should be understood that the signal processing method may be performed by the controller in the first aspect or the second aspect.

The first frequency domain resource to be scheduled in the second time unit is determined based on the resource scheduling information received in the first time unit, so that a modulation frequency used for up conversion in the second time unit is further determined, and fast switching is implemented through a fast switching phase-locked loop. Therefore, in a case of dynamic spectrum resource scheduling in a communications system, fast switching can be implemented between two adjacent time units. This can prevent a distortion signal from falling onto a guard band in the scenario of dynamic spectrum resource scheduling, and helps reduce interference caused to another user or system.

With reference to the fourth aspect, in some possible implementations, the method further includes: determining a first frequency signal based on the expected frequency point of the radio frequency signal, the center frequency point of the digital baseband signal, and the guard band that corresponds to the first frequency domain resource; and based on the first frequency signal, determining the frequency control word and sending the frequency control word to the fast switching phase-locked loop.

Therefore, the frequency control word corresponds to the scheduled first frequency domain resource, and the frequency control word is accordingly adjusted with a change of the scheduled frequency domain resource.

With reference to the fourth aspect, in some possible implementations, the method further includes: controlling a digital frequency converter to perform digital frequency conversion on the digital baseband signal in the second time unit based on the first frequency signal.

That is, digital-domain frequency conversion is performed to compensate for a change value of the modulation frequency used for analog-domain frequency conversion, to ensure that the transmitted radio frequency signal remains at the expected frequency point.

According to a fifth aspect, a readable storage medium is provided, and includes a program or an instruction. When the program or the instruction is run on a computer, the method in any one of the fourth aspect or the possible implementations of the fourth aspect is performed.

According to a sixth aspect, a computer program product is provided. The computer program product includes computer program code. When the computer program code is run on a computer, the method in any one of the fourth aspect or the possible implementations of the fourth aspect is performed.

According to a seventh aspect, a chip system is provided. The chip system includes a processor, configured to support a radio frequency transmitter to implement a function in any one of the fourth aspect or the possible implementations of the fourth aspect. In a possible design, the chip system further includes a memory, and the memory is configured to store a program instruction. The chip system may include a chip, or may include a chip and another discrete device.

DETAILED DESCRIPTION OF ILLUSTRATIVE EMBODIMENTS

The following describes technical solutions of this application with reference to the accompanying drawings.

Figure 1:
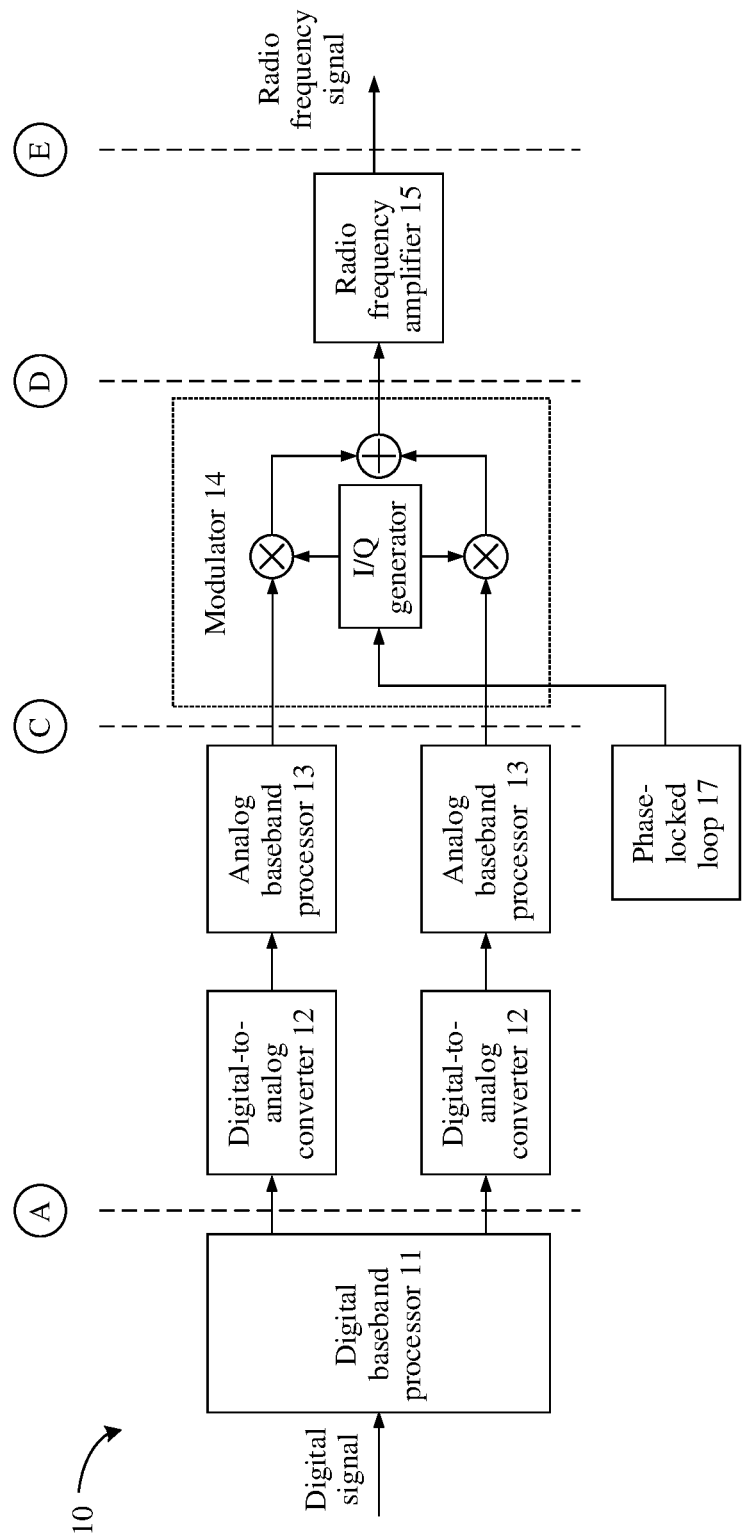
FIG. 1 is a schematic architectural diagram of a possible radio frequency transmitter according to an embodiment of this application.

A scenario to which the embodiments of this application are applicable is first described in detail with reference to FIG. 1. FIG. 1 is a schematic architectural diagram of a possible radio frequency transmitter 10 according to an embodiment of this application. Specifically, FIG. 1 shows a radio frequency transmitter having a zero-intermediate-frequency architecture. As shown in FIG. 1, the radio frequency transmitter 10 may include a digital baseband processor (DBP) 11, a digital-to-analog converter (DAC) 12, an analog baseband (ABB) processor 13, a modulator (MOD) 14, a radio frequency amplifier (AMP) 15, and the like.

After receiving a to-be-sent signal from an application processor, the digital baseband processor 11 may perform digital baseband processing on the to-be-sent signal to obtain an orthogonal digital baseband inphase/quadrature (I/Q) signal, and the digital-to-analog converter 12 performs digital-to-analog conversion on the digital baseband I/Q signal to obtain an analog baseband I/Q signal.

The digital-to-analog converter 12 may be configured to convert the digital baseband I/Q signal into the analog baseband I/Q signal.

The analog baseband processor 13 may further perform processing such as filtering and gain adjustment on the analog baseband I/Q signal.

The modulator 14 may be configured to perform, based on a local frequency signal, a frequency mixing operation (or referred to as frequency conversion processing) on the analog baseband I/Q signal output by the analog baseband processor 13. Specifically, the modulator 14 may generate an I path of local frequency signal and a Q path of local frequency signal through an I/Q generator, and perform up conversion on the input I analog signal and the input Q analog signal. The analog baseband signal may be moved onto a radio frequency band through the up conversion, to obtain a radio frequency signal.

The radio frequency amplifier 15 may be configured to amplify the radio frequency signal, to enable a transmit power of the radio frequency signal to reach a transmit power required for a design, and transmit the radio frequency signal at the transmit power through a transmit antenna.

Optionally, the radio frequency transmitter 10 further includes a phase-locked loop (PLL) 17. The phase-locked loop may be configured to output a frequency signal used for frequency conversion processing to the radio frequency modulator 14, and lock the frequency signal to a local frequency with comparatively high precision. In other words, the phase-locked loop may provide a local frequency signal.

It should be understood that, for ease of understanding, the figure shows the radio frequency transmitter having a zero-intermediate-frequency architecture. However, this should not constitute any limitation on this application. The radio frequency transmitter provided in this application may be alternatively a radio frequency transmitter having a superheterodyne architecture or a low intermediate-frequency architecture. For example, the modulator 14 may include a first frequency mixer and a second frequency mixer. The first frequency mixer may perform, based on a first local frequency signal, up conversion on the analog baseband I/Q signal output by the analog baseband processor 13, to obtain an up-converted signal. The second frequency mixer may perform up conversion on the up-converted signal based on a second local frequency signal, to obtain a radio frequency signal. It should be learned that, in the foregoing architecture in which two times of frequency conversion are performed, the first frequency mixer and the second frequency mixer each have a corresponding local frequency signal, to be specific, the first frequency mixer corresponds to the first local frequency signal, and the second frequency mixer corresponds to the second local frequency signal. The radio frequency transmitter 10 may include a phase-locked loop corresponding to each frequency mixer, where the phase-locked loop is configured to output, to each frequency mixer, a frequency signal used for frequency conversion processing.

For ease of description, the following still uses the radio frequency transmitter having a zero-intermediate-frequency architecture as an example to describe in detail the radio frequency transmitter and a signal method that are provided in the embodiments of this application.

Due to feature limitations of components such as the analog converter, the analog baseband processor, the radio frequency modulator, and the radio frequency amplifier, there are usually various non-ideal features such as noise and nonlinearity. Therefore, a signal output by the radio frequency amplifier may include a wanted signal and a distortion signal.

The wanted signal may be understood as a signal that actually needs to be sent. The distortion signal is a signal that deviates from an original signal or an expected signal during signal transmission, and may be caused by a non-ideal feature of a component or other factors. In the embodiments of this application, a new frequency component generated due to distortion caused by nonlinearity of a component or other factors may be referred to as a high-order harmonic. The new frequency component may interfere with the wanted signal. In the high-order harmonic, a third-order harmonic has comparatively large impact. For example, the third-order harmonic is only approximate 10 dB less than a fundamental wave on a radio frequency channel. Therefore, the following uses the third-order harmonic as an example to describe the distortion signal in detail. However, it should be understood that the high-order harmonic is not limited to the third-order harmonic, and may also include, for example, a fifth-order harmonic. This is not limited in this application.

In one aspect, due to feature limitations of components such as the digital-to-analog converter and the analog baseband processor, there are usually various non-ideal features such as noise and nonlinearity. Therefore, the output signal obtained through processing performed by the analog baseband processor may include a third-order harmonic distortion signal. After a frequency mixing operation is performed on the local frequency signal and the third-order harmonic distortion signal, the third-order harmonic distortion signal is moved onto a radio frequency band, to obtain a third-order counter intermodulation (CIM3) distortion signal, which is referred to as $S_{CIM3}$. Therefore, the distortion signal may be considered as a distortion signal generated on a baseband channel. For ease of differentiation and description, such a distortion signal may be denoted as a first-type distortion signal.

In another aspect, because the harmonic exists in the local frequency signal, after the frequency mixing operation is performed on the third-order harmonic in the local frequency signal, the third-order harmonic distortion signal is output at an output end of the radio frequency modulator. After the third-order harmonic distortion signal and the wanted signal enter the radio frequency amplifier together, due to nonlinearity of the radio frequency amplifier, a CIM3 signal is generated by third-order intermodulation (inter modulation 3, IM3) parts in the two signals. Therefore, the distortion signal may be considered as a distortion signal generated on a radio frequency channel. For ease of differentiation and description, such a distortion signal may be denoted as a second-type distortion signal.

Figure 2:
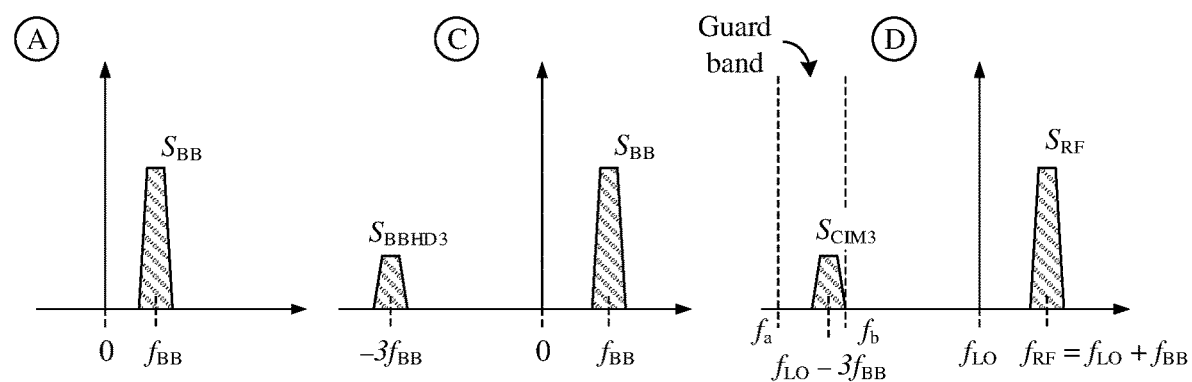
FIG. 2 is a schematic diagram of a wanted signal and a distortion signal that are output on a baseband channel according to an embodiment of this application.
Figure 3:
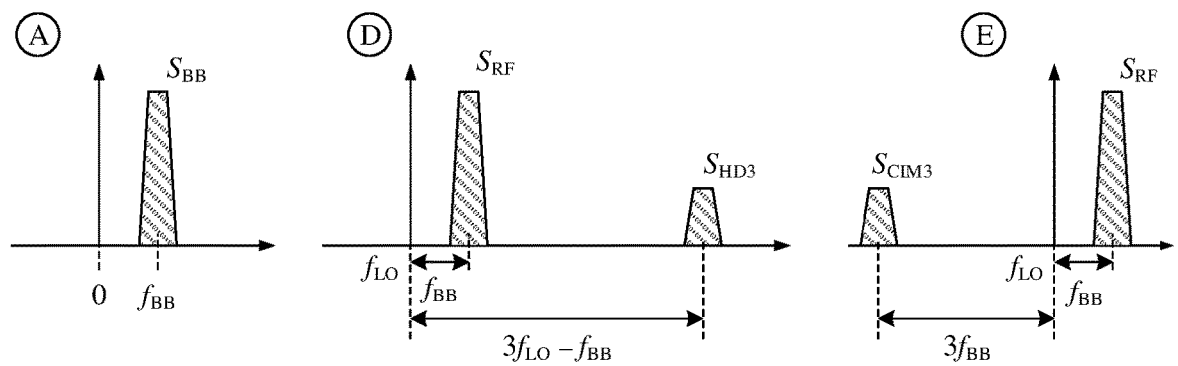
FIG. 3 is a schematic diagram of a wanted signal and a distortion signal that are output on a radio frequency channel according to an embodiment of this application.

For ease of understanding, with reference to FIG. 2 and FIG. 3, the following uses a third-order harmonic as an example to describe changes of a frequency of a distortion signal on a baseband frequency band and a radio frequency band. It is assumed that a signal output by the digital baseband processor is a signal $S_{BB}$. It may be understood that the signal $S_{BB}$ is a digital signal, where BB represents a baseband. In the embodiments, for ease of differentiation from the distortion signal, the digital signal $S_{BB}$ and a radio frequency signal $S_{RF}$ obtained by performing a frequency mixing operation on the digital signal $S_{BB}$ are referred to as wanted signals in this application.

FIG. 2 is a schematic diagram of a wanted signal and a first-type distortion signal that are output on a baseband channel according to an embodiment of this application. Center frequency points of signals shown by A, C, and D in the figure may respectively correspond to signals output at A, C, and D in FIG. 1. As shown in the figure, referring to A in FIG. 2, a center frequency point of a digital baseband signal $S_{BB}$ may be denoted as, for example, $f_{BB}$ ($f_{BB}>0$). After the digital baseband signal $S_{BB}$ is processed by the analog baseband signal processor, a new third-order harmonic signal $S_{BBHD3}$ may be generated at an output end of the analog baseband signal processor due to third-order nonlinearity of the component. BBHD represents baseband harmonic distortion, and 3 represents a third-order harmonic. Referring to C in FIG. 2, a center frequency point $f_{BBHD3}$ of the third-order harmonic signal and the center frequency point $f_{BB}$ of the digital signal $S_{BB}$ satisfy: $f_{BBHD3}=-3f_{BB}$. The third-order harmonic signal $S_{BBHD3}$ may be considered as a distortion signal generated based on the digital signal $S_{BB}$ on the baseband channel. After the modulator performs a frequency mixing operation, the center frequency point of the digital baseband signal $S_{BB}$ is moved onto a radio frequency band, to obtain a radio frequency signal $S_{RF}$. Assuming that a local frequency is $f_{LO}$ ($f_{LO}>0$), a center frequency $f_{RF}$ of the digital signal $S_{BB}$ after the digital signal $S_{BB}$ is moved onto the radio frequency band satisfies: $f_{RF}=f_{LO}+f_{BB}$, where $f_{RF}$ may also be referred to as an expected frequency point of the radio frequency signal $S_{RF}$. Referring to D in FIG. 2, a center frequency of the first-type distortion signal (that is, $S_{CIM3}$ shown in FIG. 2) may be represented as $f_{LO}+f_{BBHD3}$, and may be further transformed into $f_{LO}-3f_{BB}$.

FIG. 3 is a schematic diagram of a wanted signal and a second-type distortion signal that are output on a radio frequency channel according to an embodiment of this application. Center frequency points of signals shown by A, D, and E in the figure may respectively correspond to signals output at A, D, and E in FIG. 1. As shown in the figure, referring to A in FIG. 3, a center frequency point of a digital baseband signal $S_{BB}$ may be denoted as, for example, $f_{BB}$ ($f_{BB}>0$). A corresponding analog signal may be obtained after the digital baseband signal $S_{BB}$ is processed by the analog baseband processor, where a center frequency point of the analog signal is the same as the center frequency point of the digital baseband signal $S_{BB}$. Then, the modulator may perform a frequency mixing operation on the analog signal, to obtain a radio frequency signal $S_{RF}$ and a third-order harmonic distortion signal $S_{HD3}$, where HD represents third-order intermodulation distortion, and 3 represents third order. Referring to D in FIG. 3, an expected frequency point $f_{RF}$ of the radio frequency signal satisfies: $f_{LO}+f_{BB}$, and a center frequency of the third-order harmonic distortion signal $S_{HD3}$ satisfies: $f_{HD3}=3f_{LO}-f_{BB}$. The third-order harmonic distortion signal $S_{HD3}$ may be considered as a distortion signal generated on the radio frequency channel.

Referring to E in FIG. 3, due to nonlinearity of the radio frequency amplifier, a center frequency point of the second-type distortion signal (that is, $S_{CIM3}$ shown in FIG. 3) may be represented as $2f_{RF}-f_{HD3}$, and may be further transformed into $-(f_{LO}-3f_{BB})$.

Because the foregoing derivation process is performed based on a complex signal, a negative frequency may be derived. The complex signal is generally used for mathematical derivation. In an actual system, real signals are used. However, frequency spectra of real signals are conjugate symmetric, and power is equivalent.

In conclusion, the center frequency point $f_{CIM3}$ of the count third-order intermodulation distortion signal $S_um_3$ separately generated on the baseband channel and the radio frequency channel and the center frequency point $f_{BB}$ of the digital baseband signal $S_{BB}$ satisfy: $f_{CIM3}=f_{LO}-3f_{BB}$.

In some cases, referring to D in FIG. 2 or referring to E in FIG. 3, after the count third-order intermodulation distortion signal $S_{CIM3}$ is moved onto the radio frequency band, the corresponding count third-order intermodulation distortion signal $S_{CIM3}$ may fall onto a system-defined guard band. Assuming that a frequency range of the guard band is $[f_a, f_b]$, the center frequency $f_{CIM3}$ of the count third-order intermodulation distortion signal $S_{CIM3}$ that falls onto the guard band satisfies: $f_a \leq f_{CIM3} \leq f_b$.

It should be noted that, the guard band may be understood as a gap between frequency bands. Because the gap has no transmission function, the gap is referred to as a guard band. The guard band is a concept in frequency division multiplexing. Herein, frequency division multiplexing is a technology in which a channel bandwidth is divided into a plurality of sub-channels of different frequency bands, and the sub-channels obtained through division each can transmit one signal in parallel. In addition, frequency division multiplexing is implemented by modulating all to-be-transmitted signals onto different carrier frequencies, and a distance wide enough (that is, a guard band) is reserved between the carrier frequencies, to prevent adjacent frequency bands from overlapping with each other. In this way, signals of different frequencies do not interfere with each other during transmission. In addition, the signals can be easily separated from each other at a receive end through a band-pass filter, where a separation state before frequency division multiplexing is performed is restored. A most important reason for ensuring no interference is that a guard gap is reserved between carrier frequencies. The guard gap is the guard band.

It should be further noted that, the guard band may be a frequency band defined in a user equipment (UE) coexistence scenario in which a plurality of UEs coexist in a wireless communications system, and may correspond to some bandwidth resources, in other words, spectrum resources, in a system bandwidth. In an operating process of a radio transmitter, interference signals such as noise and spur are usually generated outside an operating bandwidth of the radio transmitter. Because spectrum resources include frequency bands allocated to a plurality of operators, when users of the operators perform communication at the same time, mutual interference may occur. To avoid mutual interference caused between users of different operators in the scenario in which UEs coexist, in a current communications protocol, for example, in 3GPP TS36.101, guard bands corresponding to different frequency bands and a preset threshold for a signal transmit power on a corresponding guard band are defined. In other words, when a frequency domain resource scheduled for UE is determined, a corresponding guard band and a preset threshold for a signal transmit power on the guard band may be determined based on a protocol-predefined mapping relationship. When a signal falls onto the guard band and a transmit power is greater than or equal to the preset threshold, interference may be caused to communication of another UE or system.

In addition, in some communications systems, for example, in LTE or 5G, a network device may dynamically schedule a physical uplink resource for a terminal device to use. For example, when a traffic volume is comparatively large, a comparatively large bandwidth resource may be scheduled, for example, a full resource block; or when a traffic volume is comparatively small, a comparatively small bandwidth resource may be scheduled, for example, one or more resource blocks (RB). If the distortion signal, for example, the count third-order intermodulation distortion signal, falls onto a system-defined guard band, when the scheduled bandwidth is switched from the full resource block to the single RB, because a transmit power remains unchanged but the bandwidth is reduced, energy of the distortion signal is more concentrated on a frequency spectrum. This results in comparatively severe interference, and a preset threshold of an interference power on the guard band may be exceeded. Therefore, the distortion signal may become an interference signal, and severely affects signal receiving quality of another user or system, thereby affecting normal communication of the another user or system.

In this application, a scenario in which a comparatively small bandwidth resource is scheduled may be referred to as a partial resource block mode (partial RB mode). It should be understood that an RB may be understood as a measure unit for a resource. One RB may occupy N contiguous subcarriers in frequency domain, and may occupy M consecutive symbols in time domain. For example, in LTE, N may be equal to 12, and M may be equal to 7; in NR, N may be equal to 12, and M may be equal to 14. It should be understood that, in the embodiments of this application, an RB may be understood as an example of a measure unit for a frequency domain resource, but should not constitute any limitation on this application. For example, a frequency domain resource may be alternatively measured in a resource element (RE), a resource block group (RBG), a predefined subband, or the like. This is not limited in this application.

It should be noted that, for ease of understanding and description, FIG. 1 merely shows the radio frequency transmitter having a zero-intermediate-frequency architecture as an example to describe in detail interference that may be caused by a distortion signal. However, this should not constitute any limitation on this application. In a conventional radio frequency transmitter architecture, for example, in a superheterodyne radio frequency transmitter architecture, a distortion signal may be generated in a processing process of an analog signal processor, or may be generated in a radio frequency modulation phase, due to nonlinearity of a radio frequency amplifier, the generated distortion signal may possibly fall onto a guard band, and when a transmit power is comparatively high, the distortion signal causes interference to another user or system.

In view of this, this application provides a radio frequency transmitter and a signal processing method, to prevent a distortion signal from falling onto a guard band, and help reduce communication interference caused by the distortion signal to another user or system.

It should be understood that, the technical solutions of the embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, universal mobile telecommunications system (UMTS), a worldwide interoperability for microwave access (WiMAX) communications system, and a future 5G system.

A terminal device in the embodiments of this application may be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with the terminal device. The network device may be a base transceiver station (BTS) in the global system for mobile communications (GSM) system or the code division multiple access (CDMA) system, may be a NodeB (NB) in the wideband code division multiple access (WCDMA) system, may be an evolved NodeB (eNB or eNodeB) in the LTE system, or may be a radio controller in a cloud radio access network (CRAN) scenario. Alternatively, the network device may be a relay node, an access point, a vehicle-mounted device, a wearable device, a network device in the future 5G network, a network device in the future evolved PLMN network, or the like. This is not limited in the embodiments of this application.

The following describes the radio frequency transmitter and the signal processing method provided in the embodiments of this application in detail with reference to the accompanying drawings.

Figure 4:
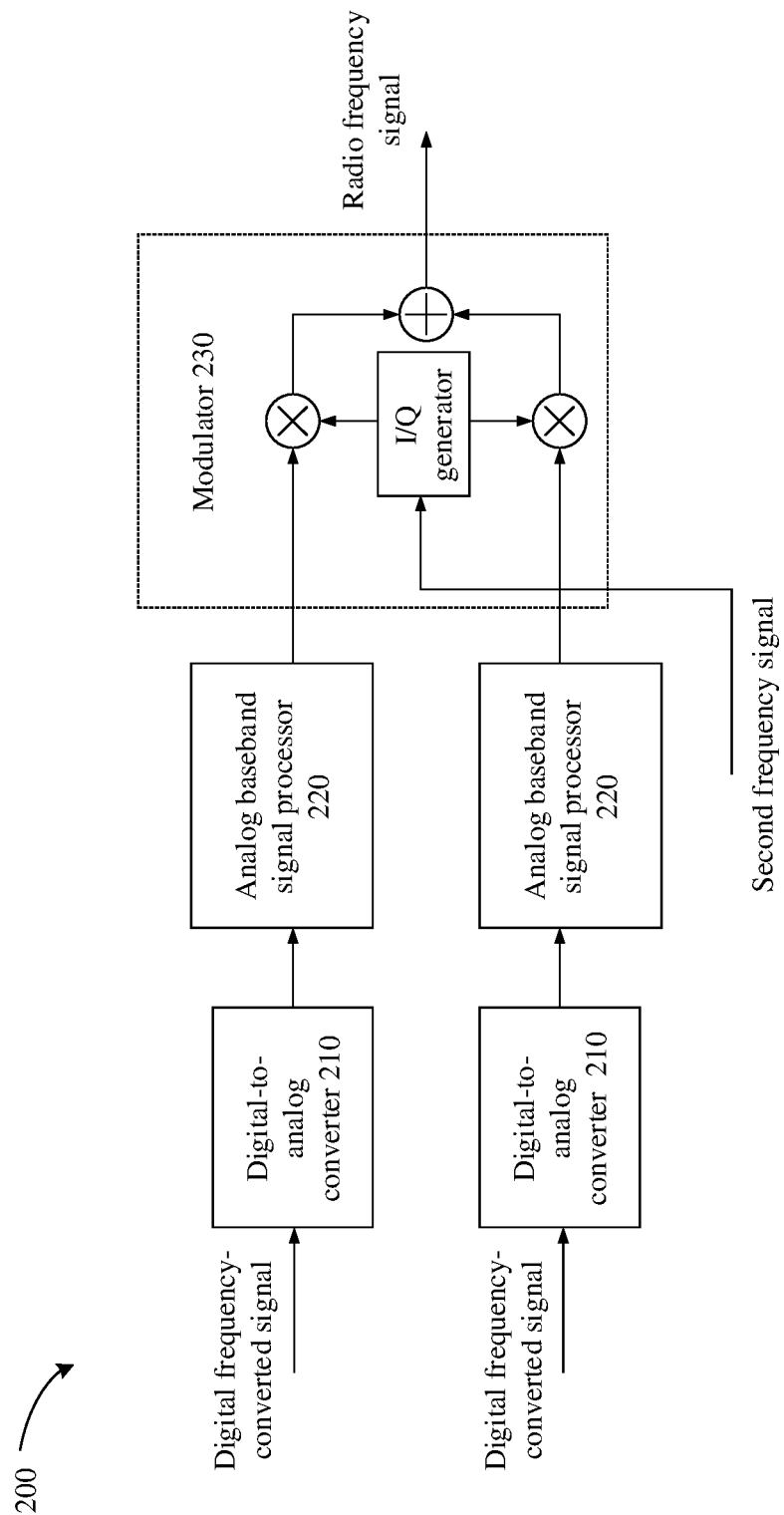
FIG. 4 is a schematic structural diagram of a radio frequency transmitter according to an embodiment of this application.

FIG. 4 is a schematic structural diagram of a radio frequency transmitter according to an embodiment of this application. As shown in FIG. 4, the radio frequency transmitter 200 includes a digital-to-analog converter 210, an analog signal processor 220, and a modulator 230.

An output end of the digital-to-analog converter 210 may be connected to an input end of the analog signal processor 220, and an output end of the analog signal processor 220 may be connected to an input end of the modulator 230.

Specifically, the digital-to-analog converter 210 may be configured to receive a digital frequency-converted signal, and perform digital-to-analog conversion on the digital frequency-converted signal to obtain an analog signal. The digital frequency-converted signal may be, for example, obtained by performing digital frequency conversion on a digital baseband signal based on a frequency signal. For ease of differentiation, the analog signal obtained through digital-to-analog conversion may be denoted as a first analog signal, the frequency signal based on which the digital frequency conversion is performed on the digital baseband signal may be denoted as a first frequency signal, and a frequency of the first frequency signal may be denoted as a first frequency value.

The analog baseband processor 220 may be configured to perform processing such as filtering and gain adjustment on the first analog signal. For ease of differentiation and description, an analog signal obtained after the analog signal processor 220 processes the first analog signal is denoted as a second analog signal.

The modulator 230 may be configured to perform up conversion based on a frequency signal and the second analog signal that is output by the analog signal processor 220, and move the second analog signal onto a radio frequency band to obtain a radio frequency signal. For ease of differentiation and description, the frequency signal based on which the up conversion is performed on the second analog signal may be denoted as a second frequency signal, and a frequency of the second frequency signal may be denoted as a second frequency value.

In this embodiment of this application, the second frequency signal may be determined based on a local frequency and the first frequency signal. Specifically, if the digital frequency-converted signal is obtained by performing down conversion on the digital baseband signal based on the first frequency signal, the second frequency signal may be a sum of a frequency of a local frequency signal and the frequency of the first frequency signal; or if the digital frequency-converted signal is obtained by performing up conversion on the digital baseband signal based on the first frequency signal, the second frequency signal may be a difference between a frequency of a local frequency signal and the frequency of the first frequency signal.

For example, assuming that the first frequency value is $f_1$ and the local frequency is $f_{LO}$, the second frequency value $f_2$ may satisfy: $f_2=f_{LO}+f_1$ or $f_2=f_{LO}-f_1$, where $f_{LO}$, $f_1$, and $f_2$ are all positive numbers.

It should be noted that, because precision of components is different, for the description that "the second frequency signal is a difference between a frequency of a local frequency signal and the frequency of the first frequency signal" or "the second frequency signal is a sum of a frequency of a local frequency signal and the frequency of the first frequency signal", there may be a deviation for the sum or the difference. A person skilled in the art may understand that the deviation may be ignored or allowed. That is, the second frequency signal is approximately equal to the difference between the frequency of the local frequency signal and the frequency of the first frequency signal, or the second frequency signal is approximately equal to the sum of the frequency of the local frequency signal and the frequency of the first frequency signal.

It should be further noted that, the foregoing description "performing, based on a frequency signal, up conversion on the second analog signal output by the analog signal processor 220" may be performing up conversion on the second analog signal directly based on the second frequency signal; or performing up conversion on the second analog signal first based on a frequency signal to obtain an up-converted signal, and then performing up conversion on the up-converted signal based on another frequency signal to obtain the radio frequency signal. This may correspond to transmitters having different architectures. The former case may correspond to a transmitter having a zero-intermediate-frequency architecture, and the latter case may correspond to a transmitter having a superheterodyne architecture or a low intermediate-frequency architecture.

Based on the foregoing design, the radio frequency transmitter in this embodiment of this application can perform digital frequency conversion on the digital baseband signal in a digital signal processing process, to compensate for some analog-domain frequency conversion, so that an analog-domain modulation frequency changes. In this way, a distortion signal that originally falls onto a guard band can be moved out from the guard band, and interference caused by the distortion signal to another user or system is reduced.

Figure 5:
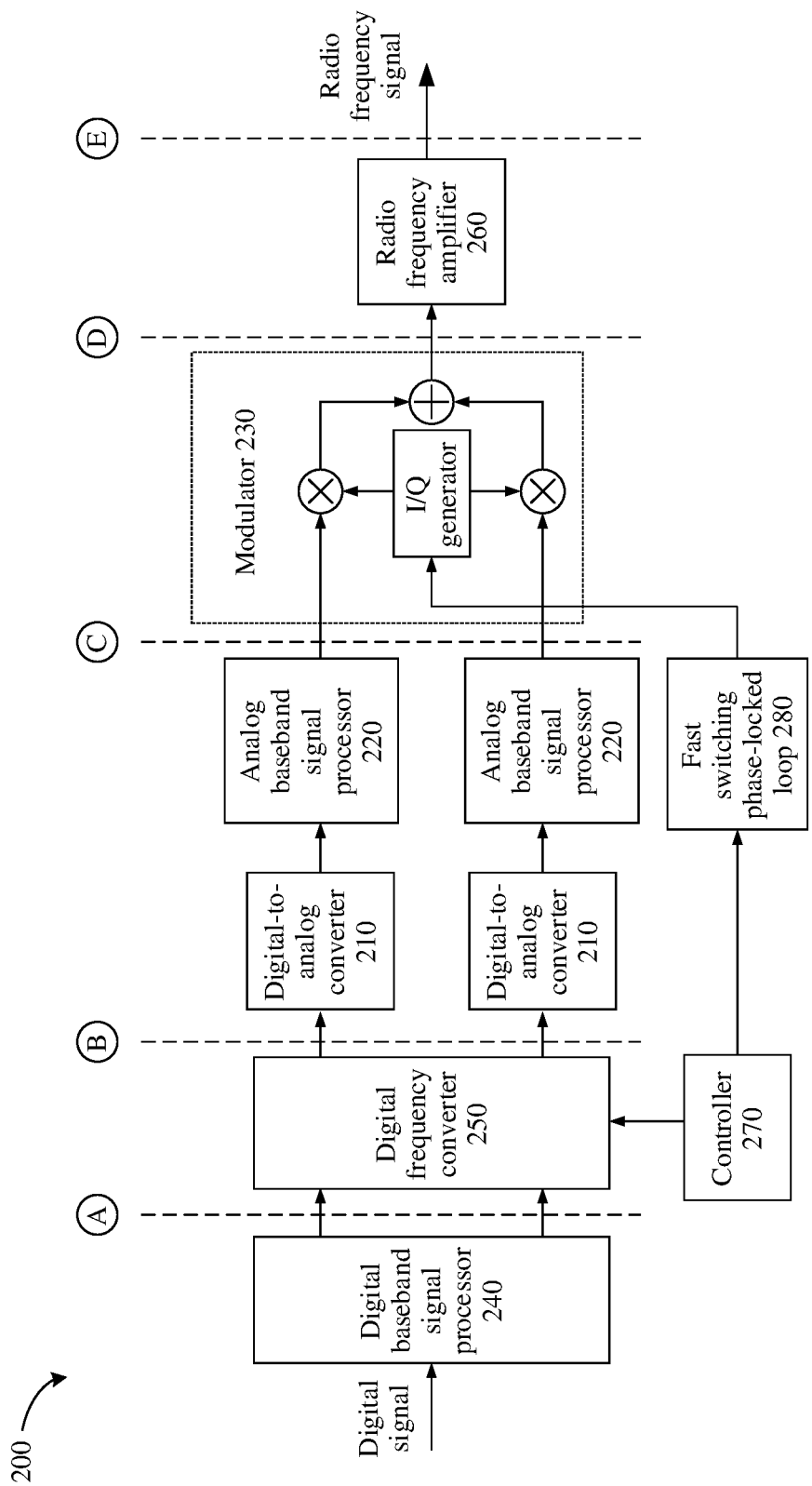
FIG. 5 is another schematic structural diagram of a radio frequency transmitter according to an embodiment of this application.

FIG. 5 is another schematic structural diagram of a radio frequency transmitter according to an embodiment of this application.

Optionally, as shown in FIG. 5, the radio frequency transmitter 200 further includes a digital baseband processor 240 and a digital frequency converter 250.

An output end of the digital baseband processor 240 may be connected to an input end of the digital frequency converter 250, and an output end of the digital frequency converter 250 may be connected to an input end of the digital-to-analog converter 210.

Specifically, the digital baseband processor 240 may be configured to receive a digital baseband signal, for example, receive a to-be-sent signal from an application processor, and perform digital baseband processing on the signal to obtain a digital baseband signal, for example, a digital baseband I/Q signal.

The digital frequency converter 250 may be configured to perform, based on the first frequency signal, digital frequency conversion on the digital baseband signal output by the digital baseband processor 240, to obtain the digital frequency-converted signal.

In this embodiment, for ease of differentiation and description, digital-domain frequency conversion processing performed on the digital baseband signal may be denoted as digital frequency conversion, and analog-domain frequency conversion processing performed on an analog signal may be denoted as analog frequency conversion. It may be understood that the digital frequency conversion may include up conversion or down conversion, and the analog frequency conversion may also include up conversion or down conversion. This is not limited in this application.

As described above, an output analog signal (for example, the second analog signal) obtained through processing performed by the analog signal processor 220 may include a wanted signal and a first-type distortion signal (for example, including a third-order distortion component of a baseband signal).

The modulator 230 may be configured to perform up conversion on the second analog signal based on the second frequency signal to obtain a radio frequency signal.

In addition, an output signal obtained through processing performed by the modulator 230 may further include a second-type distortion signal, for example, a third-order harmonic distortion signal.

Optionally, as shown in FIG. 4, the radio frequency transmitter 200 further includes a radio frequency amplifier 260. An input end of the radio frequency amplifier 26*o* may be connected to an output end of the modulator 230, and the radio frequency amplifier 26*o* is configured to amplify the radio frequency signal output by the modulator 230, to enable a transmit power of the radio frequency signal to reach a transmit power required for a design.

In a process of amplifying the radio frequency signal by the radio frequency amplifier 26*o*, nonlinear distortion also exists in a signal obtained through the amplification processing, and a generated distortion signal, for example, a third-order intermodulation distortion signal or a fifth-order intermodulation distortion signal, also satisfies the foregoing described relationship, for example, $f_{CIM5}=f_{LO}-3f_{BB}$, or $f_{CIM5}=f_{LO}+5f_{BB}$. Therefore, the digital frequency converter may be configured to perform digital frequency conversion on the digital baseband signal based on the first frequency signal when the foregoing described distortion signal satisfies an interference condition.

Optionally, the radio frequency amplifier 260 further includes a controller 270, configured to determine whether the distortion signal satisfies the interference condition. The controller 270 may further determine a first frequency value when the distortion signal satisfies the interference condition, to control the digital frequency converter 240 to perform digital frequency conversion on the digital baseband signal based on the first frequency signal.

For ease of differentiation from a controller in the following description, the controller that is configured to determine whether the distortion signal satisfies the interference condition and determine the first frequency value may be denoted as a first controller herein. The first controller may be, for example, the controller 270 shown in FIG. 5.

It should be understood that, a function of the first controller may be implemented through software, for example, physical layer software. Specifically, a processor may invoke a program or code in a memory to implement a corresponding function of the first controller; or a function of the first controller may be implemented through hardware, for example, a dedicated control circuit; or a function of the first controller may be implemented through a combination of software and hardware. This is not limited in this application.

With reference to the accompanying drawings, the following describes in detail a specific process in which the first controller determines whether the distortion signal satisfies the interference condition and determines the first frequency value.

In some communications systems, for example, in LTE or 5G, a network device may dynamically schedule a physical uplink resource for a terminal device to use. For example, the network device may periodically send resource scheduling information to the terminal device, to indicate a resource scheduled for the terminal device to use in a next period. For example, the period may be one slot.

Figure 6:
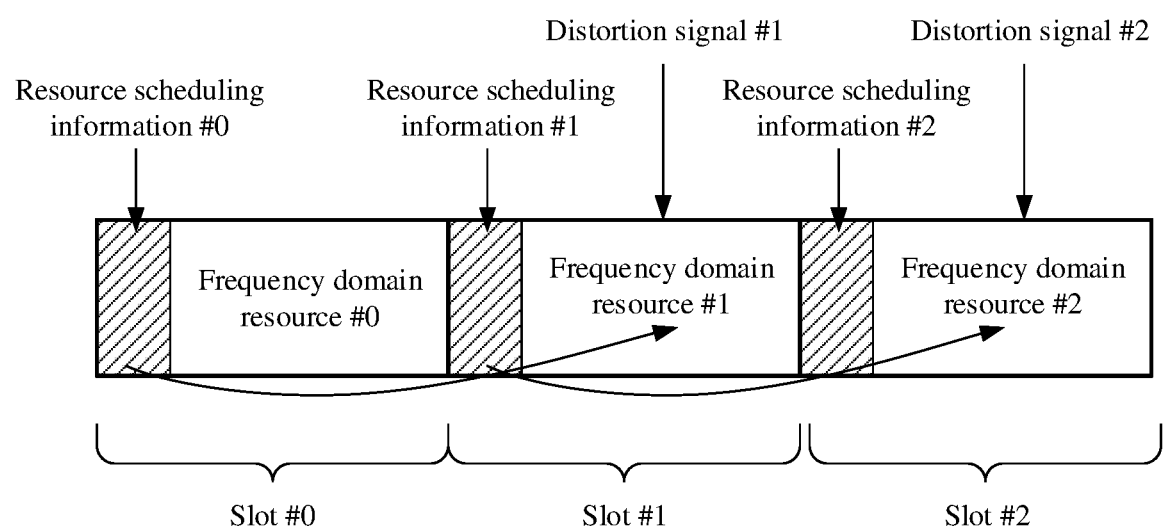
FIG. 6 is a schematic diagram of scheduling resources to a terminal device by a network device in different periods.

For example, FIG. 6 is a schematic diagram of scheduling resources to the terminal device by the network device in different periods. As shown in the figure, the network device may send resource scheduling information #0 to the terminal device in a slot #0, where the resource scheduling information #0 indicates a frequency domain resource #1 that can be used by the terminal device in a slot #1. In other words, the network device schedules, in the slot #0, the frequency domain resource #1 used in the slot #1. The network device may send resource scheduling information #1 to the terminal device in the slot #1, where the resource scheduling information #1 indicates a frequency domain resource #2 that can be used by the terminal device in a slot #2. In other words, the network device schedules, in the slot #1, the frequency domain resource #2 used in the slot #2. Other cases may be deduced by analogy, and details are not described herein. The slot #2 is after the slot #1, the slot #1 is after the slot #0, and the slot #0, the slot #1, and the slot #2 are consecutive slots in time domain.

The frequency domain resources scheduled by the network device to the terminal device in the slot #0 and the slot #1 may be a same frequency domain resource, or may be different frequency domain resources. For example, the frequency domain resource #1 scheduled for the terminal device in the slot #0 to use may be a full resource block, and the frequency domain resource #2 scheduled for the terminal device in the slot #1 to use may be a single RB; or the frequency domain resource #1 scheduled for the terminal device in the slot #0 to use may be 10 RBs, and the frequency domain resource #2 scheduled for the terminal device in the slot #1 to use may be two RBs; or a frequency domain resource scheduled for the terminal device in the slot #0 to use and a frequency domain resource scheduled for the terminal device in the slot #1 to use each may be a full resource block. This is not limited in this application.

It should be understood that, for ease of understanding, FIG. 6 merely shows a case in which a plurality of frequency domain resources are scheduled in a plurality of slots. However, this should not constitute any limitation on this application. For example, the network device may alternatively send resource scheduling information in advance to the terminal device only when a frequency domain resource scheduled for the terminal device changes. For example, a frequency domain resource scheduled for the terminal device to use in the slot #0 is the same as a frequency domain resource scheduled for the terminal device to use in the slot #1, but a frequency domain resource scheduled for the terminal device to use in the slot #2 is different from the frequency domain resource scheduled for the terminal device to use in the slot #0 and the slot #1. In this case, the network device may send resource scheduling information to the terminal device only before the slot #2 (for example, in the slot #1), to indicate a frequency domain resource that can be used by the terminal device in the slot #2 or a next slot. The network device may send resource scheduling information to the terminal device in advance when a frequency domain resource scheduled for the terminal device to use changes again. This is not limited in this application.

It should be further understood that a slot is an example of a measure unit of a time domain resource. The network device may perform uplink resource scheduling by slot, or may perform uplink resource scheduling in another measure unit of a time domain resource. For example, a time domain resource may be measured in a symbol, a mini slot (mini slot), a subframe, a predefined period of time, or the like. This is not limited in this application.

When a bandwidth of the physical uplink resource scheduled by the network device for the terminal device to use changes, a distortion signal (for example, $S_{CIM3}$) may fall onto the guard band and the transmit power is greater than or equal to a preset threshold. Therefore, optionally, the first controller may be specifically configured to: determine whether the distortion signal satisfies the interference condition; and determine the first frequency value based on a first frequency domain resource when determining that the distortion signal satisfies the interference condition.

In other words, the first controller may pre-determine, based on resource scheduling information received in a current period, whether the distortion signal satisfies the interference condition in a next period. Specifically, the first controller may determine, based on a first frequency domain resource indicated by the resource scheduling information received in this period, a guard band corresponding to the first frequency domain resource, a center frequency of a radio frequency signal to be transmitted on the first frequency domain resource, and a center frequency of a corresponding baseband signal. For example, a minimum frequency of the guard band corresponding to the first frequency domain resource may be denoted as $f_a$, and a maximum frequency of the guard band corresponding to the first frequency domain resource may be denoted as $f_b$, where $f_b > f_a > 0$. The center frequency of the radio frequency signal to be transmitted on the first frequency domain resource is a center frequency of the scheduled frequency domain resource, and may be denoted as $f_{RF}$. A center frequency of a first digital signal corresponding to the radio frequency signal is a baseband frequency, and may be denoted as $f_{BB}$. A center frequency of the distortion signal may be obtained based on the center frequency of the first digital signal, for example, the center frequency of the $S_{CIM3}$ is: $f_{CIM3} = f_{LO} - 3f_{BB}$.

When determining whether the distortion signal satisfies the interference condition in the next period, the first controller may perform pre-determining based on a scheduled frequency domain resource to be used in the next period and a local frequency of the modulator 230.

The distortion signal may include a first-type distortion signal and a second-type distortion signal. If analog frequency conversion is performed based on only the local frequency of the modulator 23o, an obtained distortion signal is the first-type distortion signal, where the first-type distortion signal is a distortion signal generated on a baseband channel. If analog frequency conversion and amplification processing that is performed by the radio frequency amplifier are performed based on only the local frequency of the modulator 23o, an obtained distortion signal is the second-type distortion signal, where the second-type distortion signal is a distortion signal generated on a radio frequency channel. The foregoing has described in detail a formation mechanism of the first-type distortion signal and the second-type distortion signal with reference to FIG. 1 to FIG. 3. For brevity, details are not described herein again.

In addition, for ease of differentiating whether digital frequency conversion is performed, the first-type distortion signal that is directly obtained through analog frequency conversion without digital frequency conversion and the second-type distortion signal that is directly obtained through analog frequency conversion and amplification processing without digital frequency conversion are collectively referred to as a first distortion signal; and a distortion signal obtained after digital frequency conversion, analog frequency conversion, and amplification processing are performed is referred to as a second distortion signal.

If a third-order harmonic signal is used as an example, both a center frequency of the first-type distortion signal and a center frequency of the second-type distortion signal satisfy $f_{CIM3} = f_{LO} - 3f_{BB}$. If the center frequency of the first distortion signal falls onto the guard band and a transmit power of the distortion signal is greater than or equal to the preset threshold, the first controller may determine that the first distortion signal satisfies the interference condition in the next period and digital frequency conversion needs to be performed on the first distortion signal in the next period, to enable the second distortion signal obtained through digital frequency conversion to fall onto the guard band in the next period.

It should be noted that, the foregoing description "performing analog processing based on only the local frequency of the modulator 230" may specifically mean the following: directly performing digital-to-analog conversion, filtering, gain adjustment, and the like on a digital baseband signal without performing digital frequency conversion, to obtain an analog signal; and performing analog frequency conversion on the analog signal based on the local frequency, to obtain a radio frequency signal and a third-order harmonic distortion signal that is generated on a baseband channel.

Similarly, the foregoing description "performing analog frequency conversion and amplification processing based on only the local frequency of the modulator 230" may specifically mean the following: directly performing digital-to-analog conversion, filtering, gain adjustment, and the like on a digital baseband signal without performing digital frequency conversion, to obtain an analog signal; performing analog frequency conversion on the analog signal based on the local frequency, to obtain a radio frequency signal and obtain a third-order harmonic distortion signal of a local frequency signal; and then performing amplification processing on the radio frequency signal and the third-order harmonic distortion signal, to obtain a radio frequency signal and a second-type distortion signal.

That is, the foregoing description "based on only" means whether digital frequency conversion is performed, but does not mean that any other processing is not performed except analog frequency conversion. In other words, the first distortion signal may include: nonlinear distortion caused after the digital baseband signal is directly processed by the digital-to-analog converter and the analog baseband processor, or nonlinear distortion caused after the digital baseband signal is directly processed by the digital-to-analog converter, the analog baseband processor, the modulator, and the radio frequency amplifier. Correspondingly, the second distortion signal may include: nonlinear distortion caused after the digital frequency-converted signal is processed by the digital-to-analog converter and the analog baseband processor, or nonlinear distortion caused after the digital frequency-converted signal is processed by the digital-to-analog converter, the analog baseband processor, the modulator, and the radio frequency amplifier.

It should be noted that, when the first controller determines whether the first distortion signal satisfies the interference condition in the next period, the first distortion signal indicates nonlinear distortion generated after a digital signal corresponding to a frequency domain resource to be scheduled in the next period is processed. In other words, a center frequency of the first distortion signal is related to the frequency domain resource to be scheduled in the next period. More specifically, a center frequency point of the digital baseband signal based on which the first distortion signal is generated corresponds to an expected frequency point of a radio frequency signal to be transmitted on the frequency domain resource to be scheduled in the next period. For example, if $f_{CIM3}=f_{LO}-3f_{BB}$ and $f_{RF}=f_{LO}+f_{BB}$, $f_{CIM3}=f_{RF}-3f_{BB}$. Both $f_{BB}$ and $f_{RF}$ correspond to the frequency domain resource to be scheduled in the next period. Therefore, the center frequency of the first distortion signal also corresponds to the frequency domain resource to be scheduled in the next period.

For ease of understanding, description is still made with reference to the foregoing description and the example in FIG. 6.

The first controller may pre-determine, in the slot #0, whether a distortion signal #1 to be generated in the slot #1 satisfies the interference condition. A center frequency of the distortion signal #1 corresponds to the frequency domain resource #1 to be used by the terminal device in the slot #1. In this case, the frequency domain resource #1 may be understood as an example of the first frequency domain resource, the scheduled frequency domain resource #0 to be used in the slot #0 may be understood as an example of a second frequency domain resource, and the distortion signal #1 may be understood as an example of the first distortion signal.

The first controller may also pre-determine, in the slot #1, whether a distortion signal #2 to be generated in the slot #2 satisfies the interference condition. A center frequency of the distortion signal #2 corresponds to the frequency domain resource #2 to be used by the terminal device in the slot #2. In this case, the frequency domain resource #2 may be understood as another example of the first frequency domain resource, the frequency domain resource #1 may be understood as another example of the second frequency domain resource, and the distortion signal #2 may be understood as another example of the first distortion signal.

A specific process in which the controller 210 determines whether the distortion signal #2 satisfies the interference condition is described in detail below by using an example in which the frequency domain resource #2 is used as the first frequency domain resource, the frequency domain resource #1 is used as the second frequency domain resource, and the distortion signal #2 is used as the first distortion signal. It may be understood that the distortion signal #2 may be the first distortion signal generated after the first digital signal to be transmitted on the frequency domain resource #2 is processed, that is, the first distortion signal to be generated in the slot #2. For ease of description, it is assumed herein that the distortion signal #2 is the count third-order intermodulation distortion signal $S_{CIM3}$.

When the first controller pre-determines, in the slot #1, whether the distortion signal #2 to be generated in the slot #2 satisfies the interference condition, the first controller may first determine whether the distortion signal #2 falls onto the guard band if analog frequency conversion is performed based on only the local frequency.

Specifically, if the center frequency point of the first digital signal is $f_{BB}$, and digital-to-analog conversion and analog frequency conversion are performed on the first digital signal, it may be determined that a center frequency point of a wanted signal is $f_{RF}=F_{BB}+f_{LO}$, and a center frequency point of the distortion signal #2 is $f_{CIM3}=f_{LO}-3f_{BB}$.

If the center frequency point $f_{CIM3}$ of the distortion signal #2 does not fall onto a range $[f_a, f_b]$ of the guard band, it is considered that the center frequency point of the distortion signal #2 does not fall onto the guard band, and the first controller may determine that the distortion signal #2 does not satisfy the interference condition. If the center frequency point $f_{CIM3}$ of the distortion signal #2 falls onto a range $[f_a, f_b]$ of the guard band, it is considered that the center frequency point of the distortion signal #2 falls onto the guard band, and the first controller may further determine whether a transmit power of the distortion signal #2 is greater than or equal to the preset threshold. If the transmit power is greater than or equal to the preset threshold, the controller 270 may determine that the distortion signal #2 satisfies the interference condition. If the transmit power is less than the preset threshold, the first controller may determine that the distortion signal #2 does not satisfy the interference condition.

It should be understood that the specific process in which the first controller determines whether the first distortion signal satisfies the interference condition is only a pre-determining process, and this does not mean that the digital-to-analog conversion and analog frequency conversion have been performed on the digital baseband signal. The first controller determines, through pre-calculation based on only the local frequency, the center frequency point of the baseband signal corresponding to the first frequency domain resource, and the expected frequency point of the radio frequency signal corresponding to the first frequency domain resource, whether the first distortion signal satisfies the interference condition in the next period.

It should be noted that, the transmit power of the first distortion signal may be determined based on a pre-obtained correspondence between a transmit power of a wanted signal and the transmit power of the first distortion signal. For example, a functional relationship between the transmit power of the wanted signal and the transmit power of the first distortion signal may be determined based on simulation experiments. In a signal sending process, the transmit power of the first distortion signal may be calculated based on the transmit power of the wanted signal, to determine whether the transmit power of the first distortion signal is greater than or equal to the preset threshold. In addition, the functional relationship between the transmit power of the wanted signal and the transmit power of the first distortion signal may be different if a different radio frequency transmitter is used. A specific relationship between the transmit power of the wanted signal and the transmit power of the first distortion signal is not limited in this application.

It should be further understood that, for ease of understanding, the foregoing describes in detail, by using an example in which a slot is a time unit, the specific process in which the first controller determines whether the first distortion signal satisfies the interference condition. In an actual execution process, the first controller may periodically pre-determine, by using a time unit (for example, a slot) as a period, whether the first distortion signal satisfies the interference condition; or based on whether a scheduled frequency domain resource changes, may pre-determine, only when a change occurs, whether the first distortion signal satisfies the interference condition, for example, may perform pre-determining only when resource scheduling information is received. This is not limited in this application. In the latter case, an operation performed by the first controller is similar to the foregoing described specific process of periodic pre-determining. For brevity, details are not described herein again.

After determining that the distortion signal satisfies the interference condition, the first controller may further determine the first frequency value based on which digital frequency conversion is performed on the digital baseband signal.

Specifically, the first controller may be configured to determine a corresponding guard band, a center frequency of the radio frequency signal, and a center frequency of the first digital signal based on the scheduled first frequency domain resource, and determine the first frequency value based on the determined guard band, the determined center frequency of the radio frequency signal, and the determined center frequency of the first digital signal.

A first frequency domain resource indicated by the network device may be understood as a frequency domain resource used to transmit the radio frequency signal. In other words, the expected frequency point of the radio frequency signal may be a frequency at a central location of the first frequency domain resource. In addition, an operating frequency band of a baseband ranges from −10 MHz to 10 MHz, that is, the operating frequency band of the baseband spans 20 MHz. A center frequency point of the digital baseband signal may be a frequency at a center location of a baseband frequency band corresponding to the scheduled first frequency domain resource. Therefore, the first controller may determine the expected frequency point of the radio frequency signal and the center frequency point of the digital baseband signal based on the scheduled first frequency domain resource.

A frequency domain resource allocated by the network device to the terminal device to use may be specific, for example, the frequency domain resource may be a resource whose frequency ranges from 1895 MHz to 1915 MHz. As service traffic changes, the first frequency domain resource scheduled by the network device for the terminal device to use may be some or all of resources whose frequencies range from 1895 MHz to 1915 MHz. In other words, the network device may configure different RBs with frequencies ranging from 1895 MHz to 1915 MHz for the terminal device to use. In other words, in a communications system, a frequency domain resource allocated to the terminal device to use is comparatively static, but an RB resource may be dynamically scheduled and may change in each time unit.

For example, when the first frequency domain resource scheduled by the network device for the terminal device to use is a resource whose frequency ranges from 1895 MHz to 1915 MHz, the first frequency domain resource is scheduled in a full resource block mode, and the expected frequency point of the radio frequency signal to be transmitted on the first frequency domain resource is 1900 MHz. The baseband frequency band corresponding to the first frequency domain resource may be −10 MHz to 10 MHz, and the center frequency point of the digital baseband signal may be 0 Hz. In this case, a transmit power exists on the entire frequency band ranging from −10 MHz to 10 MHz, and this may be considered that signal transmission is performed on the entire frequency band ranging from −10 MHz to 10 MHz. For another example, when the first frequency domain resource scheduled by the network device for the terminal device to use is a resource whose frequency ranges from 1910 MHz to 1915 MHz, the first frequency domain resource is scheduled in a partial resource block mode, and the expected frequency point of the radio frequency signal to be transmitted on the first frequency domain resource is 1912.5 MHz. The baseband frequency band corresponding to the first frequency domain resource may range from 5 MHz to 10 MHz, and the center frequency point of the digital baseband signal may be 7.5 MHz. In this case, a transmit power exists on some frequency bands ranging from −10 MHz to 10 MHz, and this may be considered that signal transmission is performed on some frequency bands ranging from −10 MHz to 10 MHz.

In addition, a correspondence between a frequency domain resource and a guard band may be predefined, for example, the correspondence is protocol-defined. The correspondence may be pre-stored on the terminal device, for example, the correspondence may be pre-stored in a memory of the terminal device, and the first controller may determine a location of the guard band and a frequency range of the guard band based on the scheduled first frequency domain resource and the foregoing correspondence. The first controller may further determine the first frequency value based on the determined frequency range of the guard band, the center frequency of the radio frequency signal, and the center frequency of the first digital signal. That is, the first frequency signal may be set based on the scheduled first frequency resource. More specifically, the first frequency signal may be set based on the expected frequency point of the radio frequency signal, the center frequency point of the digital baseband signal, and the guard band that corresponds to the first frequency resource.

For ease of understanding and description, the center frequency of the count third-order intermodulation distortion signal is still used as an example. The first controller may determine the center frequency of the count third-order intermodulation distortion signal based on the expected frequency point of the radio frequency signal and the center frequency of the digital baseband signal that are pre-determined, and further determine, based on the center frequency point of the count third-order intermodulation distortion signal and the frequency range of the guard band, the first frequency value $f_1$ used for digital frequency conversion. To prevent the center frequency point of the count third-order intermodulation distortion signal from falling onto the guard band, $f_{CIM3}$ may be controlled to satisfy:

$$f_{CIM3} < f_a; \text{ or} \quad \text{Formula 1:}$$

$$f_{CIM3} > f_b. \quad \text{Formula 2:}$$

Figure 7:
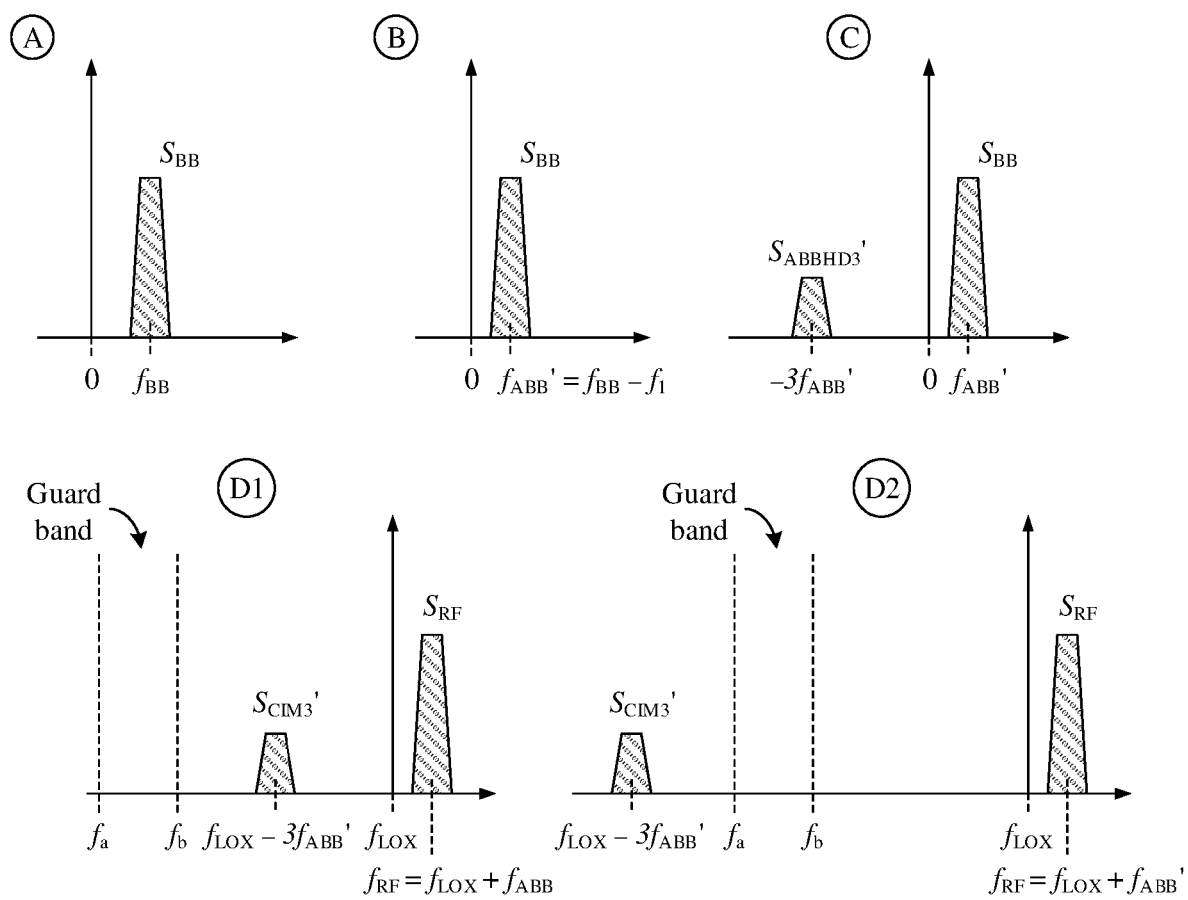
FIG. 7 is a schematic diagram of a wanted signal and a distortion signal that are obtained by sequentially performing digital frequency conversion based on a first frequency value and analog frequency conversion based on a second frequency value.
Figure 8:
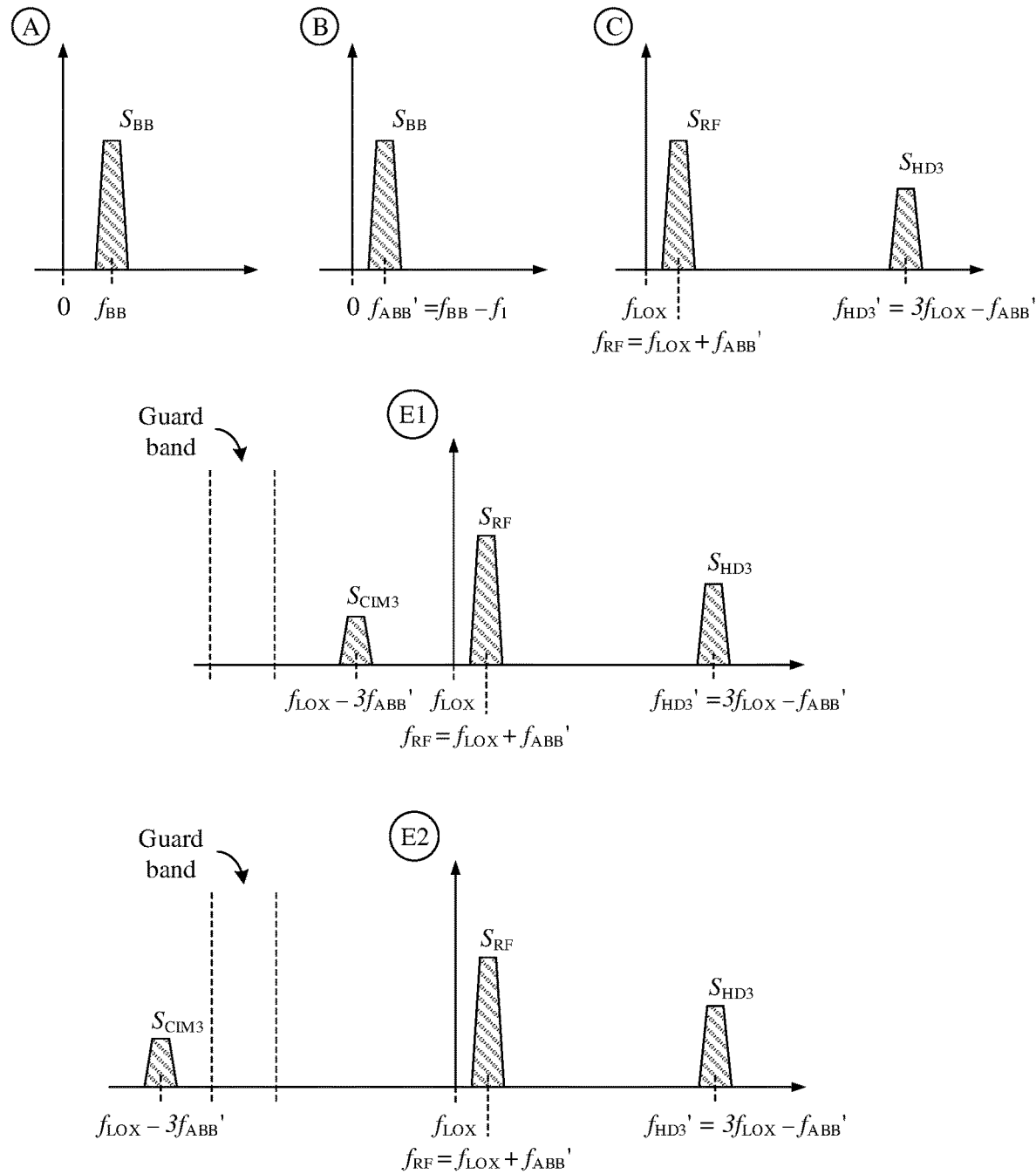
FIG. 8 is another schematic diagram of a wanted signal and a distortion signal that are obtained by sequentially performing digital frequency conversion based on a first frequency value and analog frequency conversion based on a second frequency value.

For ease of understanding, FIG. 7 and FIG. 8 each show a schematic diagram of a wanted signal and a second distortion signal that are obtained by sequentially performing digital frequency conversion based on the first frequency signal (or the first frequency value $f_1$) and analog frequency conversion based on the second frequency signal (or the second frequency value f2).

Specifically, the distortion signal shown in FIG. 7 indicates nonlinear distortion from a baseband channel. Center frequency points of signals shown by A, B, C, and D in FIG. 7 may respectively correspond to signals output at A, B, C, and D in FIG. 5. Referring to A in FIG. 7, a center frequency point of a digital baseband signal is $f_{BB}$. Referring to B in FIG. 7, a center frequency point of a digital frequency-converted signal that may be obtained by performing digital frequency conversion based on the first frequency signal is $f_{ABB}'=f_{BB}+f_1$. Referring to C in FIG. 7, a center frequency point $f_{ABBHD3}'=-3f_{ABB}'=-3(f_{BB}+f_1)$ of a third-order harmonic generated after processing of the analog signal processor. For ease of differentiation from the center frequency point $f_{ABBHD3}$ of the third-order harmonic on which first frequency conversion processing is not performed, the center frequency point of the third-order harmonic generated after digital frequency conversion processing and processing that is performed by the analog signal processor is denoted as $f_{ABBHD3}'$ herein. If the second frequency value used for analog frequency conversion is $f_2=f_{LO}-f_1$, a center frequency point of a wanted signal obtained through second frequency conversion processing is still $f_{RF}=f_{LOX}+f_{ABB}'$, and a center frequency point of a count third-order intermodulation distortion signal $S_{CIM3}'$ is $f_{CIM3}'=f_{LOX}+f_{ABBHD3}'=f_{LOX}-3f_{ABB}'=f_1-4(f_{BB}+f_1)$. For ease of differentiation from the count third-order intermodulation distortion signal $S_{CIM3}$ on which first frequency conversion processing is not performed, the count third-order intermodulation distortion signal generated through digital frequency conversion and analog frequency conversion is denoted as $S_{CIM3}'$ herein, and the center frequency point of $S_{CIM3}'$ is denoted as $f_{CIM3}'$. It may be understood that, in contrast to the first distortion signal, the count third-order intermodulation distortion signal $S_{CIM3}'$ generated through digital frequency conversion and analog frequency conversion may be a type of second distortion signal.

The distortion signal shown in FIG. 8 indicates nonlinear distortion from a radio frequency channel. Center frequency points of signals shown by A, B, C, and E in FIG. 8 may respectively correspond to signals output at A, B, C, and E in FIG. 5. Referring to A in FIG. 8, a center frequency point of a digital baseband signal is $f_{BB}$. Referring to B in FIG. 8, a center frequency point of a digital frequency-converted signal that may be obtained by performing digital frequency conversion based on the first frequency value $f_1$ is $f_{ABB}'=f_{BB}+f_1$. A radio frequency signal $S_{RF}$ and a third-order harmonic signal $SHD_3$ may be obtained after processing is performed by the analog signal processor and analog frequency conversion. Referring to C in FIG. 8, an expected frequency point of the radio frequency signal $S_{RF}$ is: $f_1=f_{LOX}+f_{ABB}'$, and a center frequency point of the third-order harmonic signal $S_{HD3}$ is: $f_{HD3}'=3f_{LOX}-f_{ABB}'$. In this case, a center frequency point of a generated count third-order intermodulation distortion signal $S_{CIM3}'$ is: $f_{CIM3}'=2f_{RF}-f_{HD3}'=f_{LOX}-3f_{ABB}'=f_{RF}-4(f_{BB}+f_1)$. It may be understood that, in contrast to the first distortion signal, the count third-order intermodulation distortion signal $S_{CIM3}'$ generated through digital frequency conversion, analog frequency conversion, and radio frequency amplification may be another type of second distortion signal.

After $f_{um3}'$ is substituted into Formula 1 or Formula 2, it may be obtained that the first frequency value $f_1$ satisfies: $f_1 > (f_{RF}-f_a)/4 - f_{BB}$, or $f_1 < (f_{RF}-f_b)/4 - f_{BB}$. D1 in FIG. 7 and E1 in FIG. 8 each show a center frequency point of the count third-order intermodulation distortion signal when Formula 1 is satisfied. D2 in FIG. 7 and E2 in FIG. 8 each show a center frequency point of the count third-order intermodulation distortion signal when Formula 2 is satisfied.

According to Formula 1 or Formula 2, the first controller 270 may determine the first frequency value $f_1$ used for digital frequency conversion, and may output the first frequency value $f_1$ to the digital frequency converter 250, so that the digital frequency converter 250 performs digital frequency conversion on the digital baseband signal based on the first frequency signal.

It should be understood that, for ease of understanding and description, the foregoing describes, by using the count third-order intermodulation distortion signal as an example, the specific method for determining the first frequency value by the controller based on the scheduled first frequency domain resource. However, this should not constitute any limitation on this application. The controller may determine, according to the same method, a frequency value used for digital frequency conversion specific to a distortion signal that may be generated based on another high-order harmonic, for example, a fifth-order harmonic. In this case, if analog frequency conversion is performed based on only a local frequency, a center frequency point of a count fifth-order intermodulation distortion signal $S_{CIM5}$, and the center frequency point $f_{BB}$ of the digital baseband signal may satisfy: $f_{CIM5}=f_{LO}+5f_{BB}$. According to the same principle, the first controller can also determine the first frequency value used for digital frequency conversion.

It should be further understood that, for ease of understanding, the foregoing describes in detail the specific process in which the first controller determines whether the first distortion signal satisfies the interference condition and determines the first frequency value. However, this should not constitute any limitation on this application. An execution body for determining whether the first distortion signal satisfies the interference condition and determining the first frequency value is not limited in this application.

It should be noted that, when the first controller determines the first frequency value used for digital frequency conversion for two or more consecutive times, for example, when the first controller determines, in the slot #0 shown in FIG. 6, a first frequency value #1 used in the slot #1, and determines, in the slot #1, a first frequency value #2 used in the slot #2, values of the first frequency value #1 and the first frequency value #2 may be the same or different. This is not limited in this application. If the first frequency value #1 is the same as the first frequency value #2, it may be considered that the first frequency value is switched from the first frequency value #1 to the second frequency value #2 in the slot #1. If the first frequency value #1 is different from the first frequency value #2, the first frequency value used in the slot #0 may continue to remain unchanged in the slot #1.

It should be further noted that, when the first controller determines the first frequency value used for digital frequency conversion for two or more consecutive times, for example, when the first controller determines, in the slot #0 shown in FIG. 6, a first frequency value #1 used in the slot #1, and determines, in the slot #1, a first frequency value #2 used in the slot #2, the first frequency value #1 may be greater than 0 or less than 0, and the second frequency value #2 may be 0. In this case, it may be considered that digital frequency conversion is not performed in the slot #2. The controller 270 may input a first frequency value 0 to the digital frequency converter 250 to skip performing digital frequency conversion, or the controller 270 may directly bypass the digital frequency converter 250 to skip performing digital frequency conversion. This is not limited in this application.

Based on the foregoing design, the radio frequency transmitter in this embodiment of this application can determine, based on a scheduled frequency domain resource, a modulation frequency used for digital frequency conversion, that is, perform digital-domain frequency conversion processing on a signal in a digital signal processing process, to compensate for some analog-domain frequency conversion processing. A modulation frequency used for analog-domain frequency conversion processing may be indirectly controlled by controlling the modulation frequency used for digital-domain frequency conversion processing. In this way, a distortion signal that originally falls onto a guard band can be moved out from the guard band, and interference caused by the distortion signal to another user or system is reduced.

In addition, when a frequency domain resource scheduled by a system changes, a signal processing apparatus in this embodiment of this application can pre-determine whether a distortion signal causes interference to another user or system, and pre-determine, when interference may be caused, a frequency conversion frequency used for digital-domain frequency conversion processing, to slightly move a frequency location of the distortion signal to move the distortion signal that originally falls onto the guard band out from the guard band, thereby reducing communication interference caused to the another user or system. Compared with an existing radio frequency transmitter, the controller is used to perform pre-determining and frequency planning, so that adjustment can be performed at any time based on the change of the frequency domain resource. This is more flexible and proper.

In a communications system, for example, in LTE or 5G, a spectrum resource is scheduled dynamically, that is, a center frequency point of the baseband signal may be different in each communication slot. Therefore, to ensure fast switching between modulation frequencies used for analog frequency conversion between two adjacent time units, a fast switching phase-locked loop is introduced into the radio frequency transmitter in this embodiment of this application, to implement fast switching.

Optionally, as shown in FIG. 5, the radio frequency transmitter 200 further includes a fast switching phase-locked loop (fast switching phase locked loop, FS-PLL) 280. An output end of the fast switching phase-locked loop 280 may be connected to the input end of the modulator 230, and the fast switching phase-locked loop 280 is configured to output the second frequency signal to the modulator 230.

Specifically, the fast switching phase-locked loop 280 may be configured to switch the modulation frequency from a third frequency signal to the second frequency signal. The third frequency signal may be a frequency signal used for up conversion in a previous time unit. For example, the modulator 230 performs up conversion on an analog signal based on another frequency signal in the previous time unit.

Alternatively, the third frequency signal may be a local frequency signal. For example, the modulator 230 performs up conversion on an analog signal based on the local frequency signal in the previous time unit; or when no signal may be sent in the previous time unit, the modulator 23o may perform up conversion by using the local frequency as the modulation frequency by default.

As described above, the second frequency signal may be determined based on the first frequency signal and the local frequency. For example, the second frequency value may be a sum of the local frequency and the first frequency value, or may be a difference between the local frequency and the first frequency value. Because the first frequency signal is set based on the expected frequency point of the radio frequency signal, the center frequency point of the digital baseband signal, and the guard band that corresponds to the scheduled first frequency resource, the second frequency signal may also be set based on the expected frequency point of the radio frequency signal, the center frequency point of the digital baseband signal, and the guard band that corresponds to the scheduled first frequency resource.

In this embodiment of this application, the fast switching phase-locked loop may generate the second frequency signal based on a frequency control word. The frequency control word may be a control value related to the second frequency signal.

Optionally, the frequency control word may be set based on the expected frequency point of the radio frequency signal, the center frequency point of the digital baseband signal, and the guard band that corresponds to the scheduled first frequency resource.

In a possible design, there is a linear relationship between the frequency control word and the first frequency value.

For example, the frequency control word and the first frequency value may satisfy: $FCW = \alpha f_1 / f_{REF}$, where $\alpha$ represents a coefficient greater than 0, and $f_{REF}$ represents a predefined value.

Optionally, the radio frequency transmitter 200 may further include a second controller. The second controller may be configured to determine and output the frequency control word, where the frequency control word is used to control the fast switching phase-locked loop 280 to generate the second frequency signal.

Herein, for ease of differentiation and description, the controller that is configured to determine and output the frequency control word is denoted as the second controller. The second controller and the first controller that is described above may be a same controller, for example, the controller 270 shown in FIG. 4. Alternatively, the second controller and the first controller that is described above may be different controllers. Although the second controller is not shown in the figure, this should not constitute any limitation on this application.

The frequency control word may be determined by the controller 270. When the first controller and the second controller are different controllers, $f_1$ may be determined by the second controller, and then the frequency control word is determined based on the relationship between the frequency control word and the first frequency value. Alternatively, $f_1$ may be determined by the first controller and then sent to the second controller through a connection path, and then the second controller determines the frequency control word based on the relationship between the frequency control word and the first frequency value. This is not limited in this application.

It should be understood that, a function of the second controller may be implemented through software, for example, physical layer software. Specifically, a processor may invoke a program or code in a memory, to implement a corresponding function of the second controller; or a function of the second controller may be implemented through hardware, for example, a dedicated control circuit; or a function of the second controller may be implemented through a combination of software and hardware. This is not limited in this application.

Figure 9:
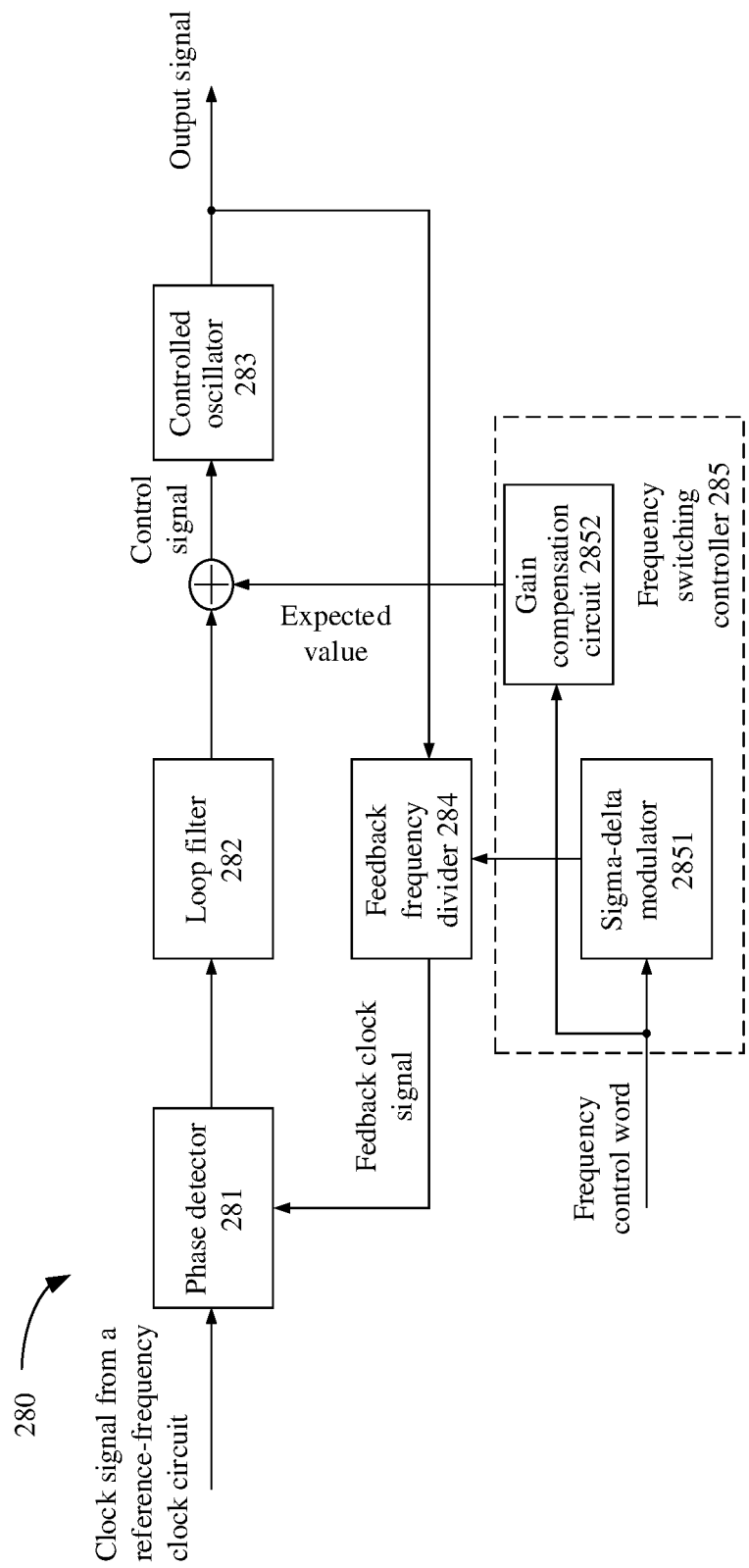
FIG. 9 is a schematic structural diagram of a fast switching phase-locked loop according to an embodiment of this application.

Optionally, with reference to FIG. 9, the following describes in detail a specific process of controlling, based on the frequency control word, the fast switching phase-locked loop 280 to generate the second frequency signal.

FIG. 9 is a schematic structural diagram of a fast switching phase-locked loop according to an embodiment of this application. As shown in the figure, the fast switching phase-locked loop 280 may include: a phase detector (PD) 281, a loop filter (LPF) 282, a controlled oscillator 283, a feedback frequency divider (DW) 284, and a frequency switching controller 285.

An output end of the phase detector 281 may be connected to an input end of the loop filter 282, an output end of the loop filter 282 may be connected to an input end of the controlled oscillator 283, and an output end of the frequency switching controller 285 may be connected to the other input end of the controlled oscillator 283, an output end of the controlled oscillator 283 may be connected to an input end of the feedback frequency divider 284, and the other output end of the frequency switching controller 285 may be connected to the other input end of the feedback frequency divider 284, and another output end of the frequency switching controller 285 may be connected to the other input end of the controlled oscillator.

Specifically, the phase detector 281 may be configured to receive a clock signal from a reference-frequency clock circuit and a clock signal from the feedback frequency divider 284. The phase detector 281 may identify a phase difference between the two clock signals based on frequencies and phases of the two input clock signals, and output a control signal, where the control signal may be related to the phase difference between the two clock signals. Because a frequency of the clock signal from the reference-frequency clock circuit is a constant value with high precision, the frequency may be referred to as a reference frequency $f_{REF}$. When a frequency of the clock signal from the feedback frequency divider 284 changes, that is, when a frequency of an output signal from the controlled oscillator 283 changes, the phase detector 281 may convert a frequency change into a phase difference, and convert the phase difference into the control signal.

The loop filter 282 may be located between the phase detector 281 and the controlled oscillator 284. Because the phase detector 281 outputs both the control signal and some high-frequency harmonics, and these harmonics affect operation of the controlled oscillator 283, the loop filter 282 may be configured to filter out these high-frequency harmonics, and output a signal used to control the controlled oscillator 283, where the signal may carry information used to represent the phase difference. Optionally, the signal may be a direct current signal.

The controlled oscillator 283 may adjust the frequency of the output signal based on the phase difference information carried in the control signal (for example, a voltage, a current, or a value), to lock the frequency of the output signal of the controlled oscillator 283 to an expected frequency value.

The frequency switching controller 285 may be configured to output a first signal to the feedback frequency divider 284 based on a frequency control word, where the first signal may be used to control a frequency division ratio of the feedback frequency divider 284, that is, control a ratio of a frequency of an input signal to a frequency of an output signal. In this embodiment, the first signal may be used to control, by controlling the frequency division ratio of the feedback frequency divider 284, the frequency of the clock signal output by the feedback frequency divider 284.

Optionally, the frequency switching controller 285 may be further configured to receive a frequency control word from a second controller. That is, an output end of the second controller may be connected to an input end of the frequency switching controller 285.

The phase detector 281, the loop filter 282, the controlled oscillator 283, the feedback frequency divider 284, and the frequency switching controller 285 may form a loop. The loop may lock a frequency of a signal output by the controlled oscillator 283 to an expected value with comparatively high precision. The loop may be understood as a feedback system.

In this embodiment of this application, the control signal output by the phase detector 281 may be a voltage signal, a current signal, or a numerical value. Based on different phase detectors 281, a corresponding loop filter 282 and a corresponding controlled oscillator 283 may be designed differently. For example, based on different signals output by the phase detector, the controlled oscillator 283 may be designed as a voltage controlled oscillator (VCO), a current controlled oscillator, or a digital controlled oscillator (DCO). This is not limited in this application.

In addition, the frequency switching controller 285 may further output a second signal to the controlled oscillator 283 based on the frequency control word. The second signal may be an expected value. The foregoing description "switching from a third frequency signal to the second frequency signal" may be implemented by inputting an expected value corresponding to the frequency control word. The expected value may be used for gain compensation for a frequency switching value Δf described below.

Optionally, the expected value output by the frequency switching controller 285 may be determined based on a gain of the controlled oscillator and an expected frequency switching value. In a possible design, the expected value FCW_KV=Δf/K. Δf represents the expected frequency switching value, and the frequency switching value may be a variation of a frequency value used for analog frequency conversion, for example, a difference between the second frequency value and the third frequency value described above. If Δf is positive value, it may indicate that the frequency value used for analog frequency conversion increases; or if Δf is a negative value, it may indicate that the frequency value used for analog frequency conversion decreases. The frequency switching value may be alternatively a variation of the first frequency value used for digital frequency conversion, for example, a difference between the first frequency value #2 and the first frequency value #1 described above. If Δf is positive value, it may indicate that the first frequency value increases; or if Δf is a negative value, it may indicate that the first frequency value decreases. K represents the gain of the controlled oscillator 283, may be understood as an eigenvalue of the controlled oscillator 283, and may be learned in advance. The frequency switching controller 285 outputs the foregoing expected value, so that the frequency value of the signal output by the controlled oscillator 283 may change by Δf, that is, is switched from $f_{LO}$ to $f_{LOX}$. As described above, the output expected value FCW_KV may be designed as a different value based on a different phase detector, for example, the output expected value FCW_KV may be a voltage value, or a current value, or a numerical value. This is not limited in this application.

The frequency switching controller 285 and the controlled oscillator 283 may be understood as a feedforward system.

In a possible design, the frequency switching controller 285 may further include a sigma-delta (Sigma-Delta) modulator 2851 and a gain compensation circuit 2852.

In the phase-locked loop, KV may be usually used to represent a VCO gain. Therefore, the gain compensation circuit may be referred to as a KVC for short.

An output end of the sigma-delta modulator 2851 may be connected to the input end of the feedback frequency divider 284, and an output end of the gain compensation circuit 2852 may be connected to the input end of the controlled oscillator 283.

Optionally, an output end of the second controller may be connected to an input end of the sigma-delta modulator 2851, and the other output end of the second controller may be connected to an input end of the gain compensation circuit 2852.

The sigma-delta modulator 2851 may be configured to generate the first signal based on the frequency control word, and input the first signal to the feedback frequency divider 284, to control the frequency of the clock signal output by the feedback frequency divider 284.

The gain compensation circuit 2852 may be configured to receive the frequency control word from the second controller (for example, the controller 270), and control the expected value output to the controlled oscillator 283. In this embodiment of this application, if it is expected that the modulation frequency of the modulator 230 switches from the third frequency value to the second frequency value, the frequency of the clock signal output by the controlled oscillator 283 may be controlled to implement the switching, and the frequency of the clock signal output by the controlled oscillator 283 may be implemented based on the expected value corresponding to the frequency control word. Based on the expected frequency switching value and the gain of the controlled oscillator 283, the gain compensation circuit 2852 may determine the expected value and output the expected value to the controlled oscillator 283, where the expected value may be used to implement gain compensation for the frequency switching value Δf.

Therefore, the sigma-delta modulator 2851, the gain compensation circuit 2852, and the controlled oscillator 283 may be understood as a feedforward system; and the phase detector 281, the loop filter 282, the controlled oscillator 283, the feedback frequency divider 284, and the sigma-delta modulator 2851 may be understood as a feedback system. With cooperation between the feedforward system and the feedback system, the fast switching phase-locked loop can implement fast switching, for example, complete switching within several microseconds, and it can be ensured that the frequency of the output clock signal remains unchanged.

Based on the foregoing design of the fast switching phase-locked loop, fasting switching of the modulation frequency of the modulator can be implemented through the feedforward system and the feedback system in this embodiment of this application, thereby implementing fast switching between two adjacent time units, for example, between two slots in a scenario of dynamic spectrum resource scheduling in a communications system. This can prevent a distortion signal from falling onto a guard band in the scenario of dynamic spectrum resource scheduling, and helps reduce interference caused to another user or system.

It should be understood that, the fast switching phase-locked loop described above with reference to FIG. 9 is a possible design for fast switching. However, this should not constitute any limitation on this application. For example, a digital phase-locked loop may be alternatively used to implement fast switching.

It should be further understood that, for ease of description, the foregoing describes the radio frequency transmitter provided in this application in detail by using the transmitter having a zero-intermediate-frequency architecture as an example. However, this should not constitute any limitation on this application. The radio frequency transmitter provided in this application may be alternatively a radio frequency transmitter having a superheterodyne architecture or a low intermediate-frequency architecture.

Optionally, the modulator 23o may include a first frequency mixer and a second frequency mixer, and the local frequency signal includes a first local frequency signal corresponding to the first frequency mixer and a second local frequency signal corresponding to the second frequency mixer.

In a possible design, the first frequency mixer may be configured to perform up conversion on the second analog signal based on the first local frequency signal, to obtain a first up-converted signal; and the second frequency mixer may be configured to perform up conversion on the first up-converted signal based on the second frequency signal to obtain the radio frequency signal.

Herein, the first up-converted signal obtained through up conversion performed by the first frequency mixer may be an intermediate frequency signal, and the first local frequency used for this up conversion may be a local frequency from a phase-locked loop. Then, the second frequency mixer may perform up conversion on the first up-converted signal based on the second frequency signal to obtain the radio frequency signal. The second frequency signal used for this up conversion may be from another phase-locked loop. In this case, the second frequency signal may be determined based on the second local frequency signal and the first frequency signal. Specifically, if the digital frequency conversion is up conversion, the second frequency signal may be a difference between a frequency of the second local frequency signal and a frequency of the first frequency signal; or if the digital frequency conversion is down conversion, the second frequency signal may be a sum of a frequency of the second local frequency signal and a frequency of the first frequency signal. Because the second frequency signal dynamically changes with a scheduled frequency domain resource, the second frequency mixer may be connected to the foregoing fast switching phase-locked loop to implement fast switching, and the first frequency mixer may be connected to an ordinary phase-locked loop to keep the first local frequency unchanged.

In another possible design, the first frequency mixer may be configured to perform up conversion on the second analog signal based on the second frequency signal, to obtain a second up-converted signal; and the second frequency mixer may be configured to perform up conversion on the second up-converted signal based on the second local frequency signal, to obtain the radio frequency signal.

Herein, the second up-converted signal obtained through up conversion performed by the first frequency mixer may be an intermediate frequency signal, and the second frequency signal used for this up conversion may be a signal from a phase-locked loop. Then, the second frequency mixer may perform up conversion on the second up-converted signal based on the second local frequency signal to obtain the radio frequency signal. The second local frequency signal used for this up conversion may be from another phase-locked loop. In this case, the second frequency signal may be determined based on the first local frequency signal and the first frequency signal. Specifically, if the digital frequency conversion is up conversion, the second frequency signal may be a difference between a frequency of the first local frequency signal and a frequency of the first frequency signal; or if the digital frequency conversion is down conversion, the second frequency signal may be a sum of a frequency of the first local frequency signal and a frequency of the first frequency signal. Because the second frequency signal dynamically changes with a scheduled frequency domain resource, the first frequency mixer may be connected to the foregoing fast switching phase-locked loop to implement fast switching, and the second frequency mixer may be connected to an ordinary phase-locked loop to keep the second local frequency unchanged.

The relationship between the second frequency signal and the first frequency signal has been described in detail above with reference to the accompanying drawings. For brevity, details are not described herein again. In addition, a person skilled in the art may understand that a range of deviation is allowed for the difference between frequencies or the sum of frequencies. For example, in a design, the second frequency signal may be approximately equal to the difference between the frequency of the second local frequency signal and the frequency of the first frequency signal, or the second frequency signal may be approximately equal to the sum of the frequency of the second local frequency signal and the frequency of the first frequency signal. In another design, the second frequency signal may be approximately equal to the difference between the frequency of the first local frequency signal and the frequency of the first frequency signal, or the second frequency signal may be approximately equal to the sum of the frequency of the first local frequency signal and the frequency of the first frequency signal.

In addition, when the radio frequency transmitter is the radio frequency transmitter having a superheterodyne architecture or a low intermediate-frequency architecture, based on the inventive concept of the embodiments of this application, a person skilled in the art may easily make variations or replacements to the radio frequency transmitter, for example, replace the foregoing digital frequency conversion with analog frequency conversion, that is, perform analog-domain frequency conversion twice based on different frequency signals, to prevent a distortion signal from falling onto a guard band. A method for determining a frequency signal used for performing frequency conversion twice is the same as the method for determining the first frequency signal and the second frequency signal provided in this application. For brevity, details are not described herein again.

This application further provides a radio frequency transmitter. A structure of the radio frequency transmitter may be shown in FIG. 10.

Figure 10:
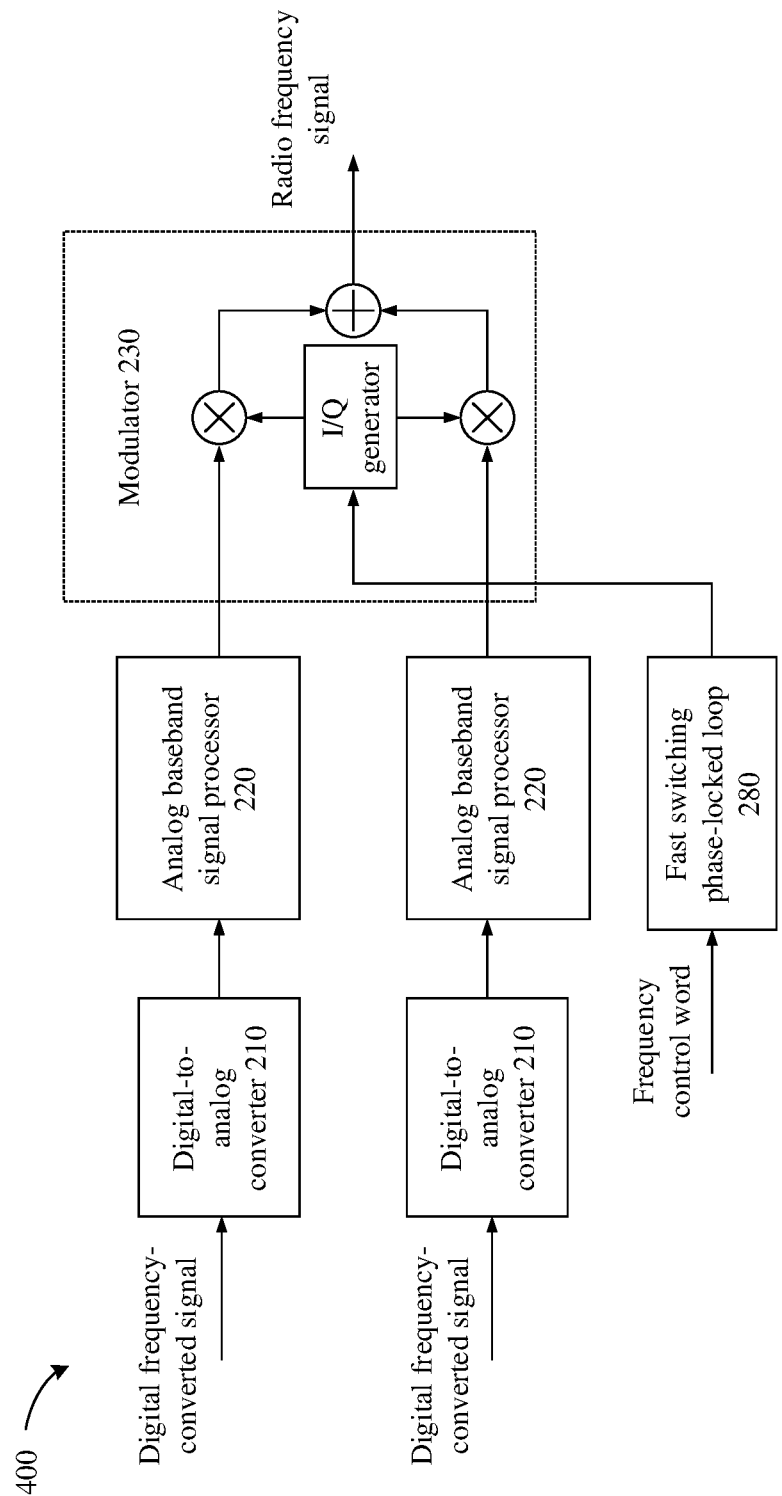
FIG. 10 is a schematic structural diagram of a radio frequency transmitter according to another embodiment of this application.

FIG. 10 is a schematic structural diagram of a radio frequency transmitter 400 according to another embodiment of this application. As shown in FIG. 10, the radio frequency transmitter 400 includes a digital-to-analog converter 210, an analog baseband signal processor 220, a modulator 230, and a fast switching phase-locked loop 280.

An output end of the digital-to-analog converter 210 may be connected to an input end of the analog signal processor 220, an output end of the analog signal processor 220 may be connected to an input end of the modulator 230, and an output end of the fast switching phase-locked loop 280 is connected to another input end of the modulator 230.

Specifically, the digital-to-analog converter 210 may be configured to receive a digital frequency-converted signal, and perform digital-to-analog conversion on the digital frequency-converted signal to obtain a first analog signal. The analog baseband processor 220 may be configured to perform processing such as filtering and gain adjustment on the first analog signal to obtain a second analog signal. The modulator 230 may be configured to perform, based on a second frequency signal, up conversion on the second analog signal output by the analog signal processor 220, and move the second analog signal onto a radio frequency band to obtain a radio frequency signal. The fast switching phase-locked loop 280 may be configured to switch from a third frequency signal to the second frequency signal. The third frequency signal may be a frequency signal used for up conversion performed by the modulator in a previous time unit or may be a local frequency signal. This is not limited in this application.

Based on the foregoing design, fast switching of the fast switching phase-locked loop enables a modulation frequency used for analog frequency conversion by the modulator changes quickly, to adapt to a dynamic change of a spectrum resource scheduled in a communications system. Therefore, the radio frequency transmitter may change the modulation frequency with a change of the scheduled spectrum resource in different time units.

Optionally, the radio frequency transmitter further includes: a digital baseband processor, configured to generate a digital baseband signal; and a digital frequency converter, configured to perform digital frequency conversion on the digital baseband signal based on a first frequency signal, to obtain the digital frequency-converted signal.

Optionally, the radio frequency transmitter further includes: a controller, configured to determine the first frequency signal based on an expected frequency point of the radio frequency signal, a center frequency point of the digital baseband signal, and a guard band that corresponds to a scheduled first frequency domain resource; and control the digital frequency converter to perform digital frequency conversion on the digital baseband signal based on the first frequency signal.

Optionally, the fast switching phase-locked loop includes: a phase detector, a loop filter, a controlled oscillator, a feedback frequency divider, and a frequency switching controller.

The frequency switching controller is configured to generate a first signal, where the first signal is used to adjust a frequency division ratio of the feedback frequency divider.

The feedback frequency divider is configured to obtain a feedback signal from an oscillation signal output by the controlled oscillator, and perform frequency division processing on the feedback signal under control of the first signal, to obtain a frequency-divided signal.

The phase detector is configured to compare the frequency-divided signal with a reference signal, to output a control signal.

The loop filter is configured to perform filtering processing on the control signal and output the control signal on which the filtering processing has been performed.

The frequency switching controller is configured to generate a second signal, where the second signal is used to control the controlled oscillator to perform frequency switching.

The controlled oscillator is configured to generate the second frequency signal under control of the second signal and the control signal on which the filtering processing has been performed.

Optionally, the frequency switching controller includes: a sigma-delta modulator, configured to generate the first signal based on a frequency control word; and a gain compensation circuit, configured to generate the second signal based on a gain of the controlled oscillator and an expected frequency switching value, where the frequency switching value is a difference between a frequency of the second frequency signal and a frequency of the third frequency signal.

Optionally, there is a linear relationship between the frequency control word and the first frequency signal.

Optionally, the controller is further configured to determine and output the frequency control word, where the frequency control word is used to control the fast switching phase-locked loop to generate the second frequency signal.

Optionally, the modulator includes a first frequency mixer and a second frequency mixer. The first frequency mixer is configured to perform up conversion on the second analog signal based on a first local frequency signal to obtain a first up-converted signal. The second frequency mixer is configured to perform up conversion on the first up-converted signal based on the second frequency signal to obtain the radio frequency signal. Herein, the first local frequency signal corresponds to the first frequency mixer, and the second frequency signal is determined based on a frequency of the first local frequency signal and a frequency of the first frequency signal.

Optionally, the modulator includes a first frequency mixer and a second frequency mixer. The first frequency mixer is configured to perform up conversion on the second analog signal based on the second frequency signal to obtain a second up-converted signal. The second frequency mixer is configured to perform up conversion on the second up-converted signal based on the second local frequency signal to obtain the radio frequency signal. Herein, the second local frequency signal corresponds to the second frequency mixer, and the second frequency signal is determined based on a frequency of the second local frequency signal and a frequency of the first frequency signal.

The radio frequency transmitter provided in this embodiment of this application may be a radio frequency transmitter having a superheterodyne architecture or a low intermediate-frequency architecture. This is not limited in this application. When the radio frequency transmitter is the radio frequency transmitter having a superheterodyne architecture or a low intermediate-frequency architecture, analog frequency conversion may be separately performed once on an intermediate frequency band and a radio frequency band. In this case, the up conversion performed based on the second frequency signal may occur on the intermediate frequency band, or may occur on the radio frequency band. This is not limited in this application.

In addition, when the radio frequency transmitter is the radio frequency transmitter having a superheterodyne architecture or a low intermediate-frequency architecture, based on the inventive concept of the embodiments of this application, a person skilled in the art may easily make variations or replacements to the radio frequency transmitter, for example, replace the foregoing digital frequency conversion with analog frequency conversion, that is, perform analog-domain frequency conversion twice based on different frequency signals, to prevent a distortion signal from falling onto a guard band. A method for determining a frequency signal used for performing frequency conversion twice is the same as the method for determining the first frequency signal and the second frequency signal provided in this application. For brevity, details are not described herein again.

It should be understood that, for a design and controlling of the fast switching phase-locked loop 280 in this embodiment of this application, refer to the fast switching phase-locked loop described above with reference to FIG. 9. For brevity, details are not described herein again.

It should be further understood that, the radio frequency transmitter provided in this embodiment of this application may be the same as the radio frequency transmitter described above with reference to FIG. 5. Because the foregoing has described the radio frequency transmitter in detail with reference to the accompanying drawing, for brevity, details are not described herein again.

It should be noted that, the foregoing describes the radio frequency transmitter provided in the embodiments of this application with reference to the accompanying drawings. Modules in the radio frequency transmitter may be implemented through hardware, may be implemented through software, or may be implemented through a combination of software and hardware. This is not limited in this application.

An embodiment of this application further provides a wireless communications apparatus. The wireless communications apparatus may include a radio frequency transmitter and an antenna. The radio frequency transmitter is configured to convert a digital baseband signal into a radio frequency and transmit the radio frequency signal through the antenna. The radio frequency transmitter may be, for example, the radio frequency transmitter shown in FIG. 4, FIG. 5, or FIG. 10. For example, the wireless communications apparatus may be a terminal device or a network device equipped with the radio frequency transmitter. Functions of the modules in the radio frequency transmitter have been described in detail above with reference to the accompanying drawings. For brevity, details are not described herein again.

It should be understood that, the foregoing describes the radio frequency transmitter provided in the embodiments of this application with reference to the accompanying drawings. Modules in the radio frequency transmitter may be implemented through hardware, may be implemented through software, or may be implemented through a combination of software and hardware. This is not limited in this application.

Figure 11:
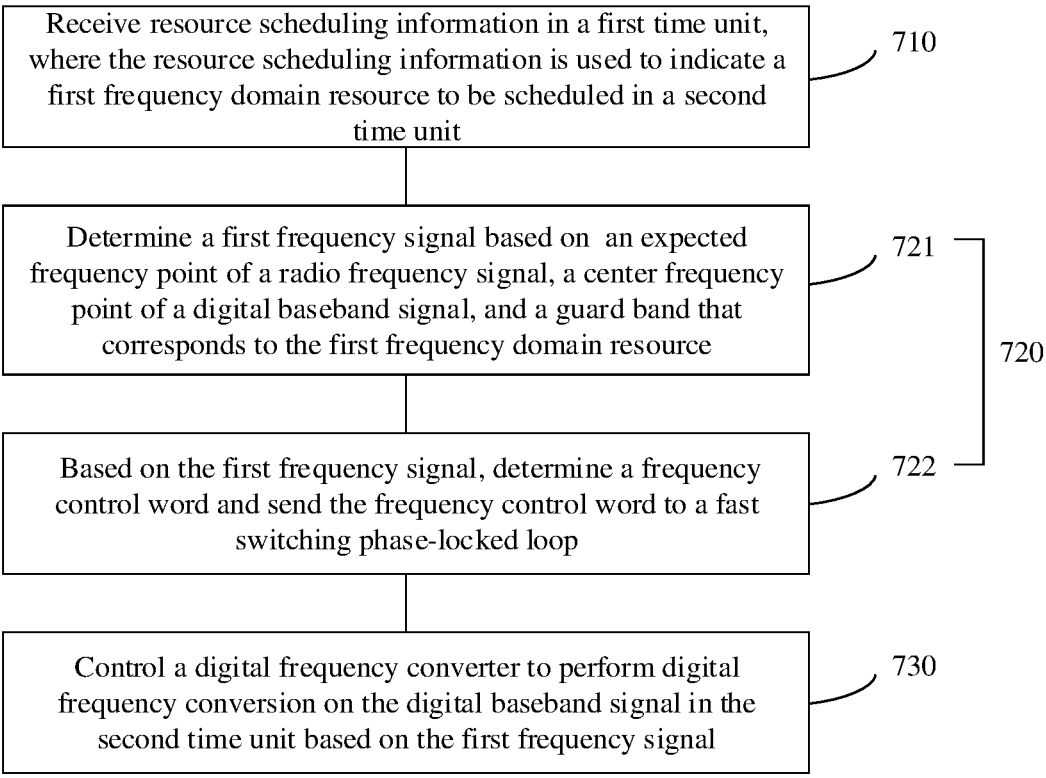
FIG. 11 is a schematic flowchart of a signal processing method according to an embodiment of this application.

An embodiment of this application further provides a signal processing method, applied to the foregoing radio frequency transmitter or a wireless communications apparatus including the foregoing radio frequency transmitter. The radio frequency transmitter may be, for example, the radio frequency transmitter shown in FIG. 5. FIG. 11 is a schematic flowchart of a signal processing method 700 according to an embodiment of this application.

As shown in FIG. 11, the method 700 includes the following steps.

Step 710: Receive resource scheduling information in a first time unit, where the resource scheduling information is used to indicate a first frequency domain resource to be scheduled in a second time unit, and the second time unit is a next time unit of the first time unit.

Step 720: Based on an expected frequency point of a radio frequency signal, a center frequency point of a digital baseband signal, and a guard band that corresponds to the first frequency domain resource, determine a frequency control word and send the frequency control word to a fast switching phase-locked loop, where the frequency control word is used to control the fast switching phase-locked loop to switch from a third frequency signal to a second frequency signal, the second frequency signal is used to perform up conversion on an analog signal in the second time unit, and the third frequency signal is a signal used to perform up conversion on the analog signal in the first time unit, or the third frequency signal is a local frequency signal.

Optionally, step 720 specifically includes the following steps.

Step 721: Determine a first frequency signal based on the expected frequency point of the radio frequency signal, the center frequency point of the digital baseband signal, and the guard band that corresponds to the first frequency domain resource.

Step 722: Based on the first frequency signal, determine the frequency control word and send the frequency control word to the fast switching phase-locked loop.

Optionally, the method 700 further includes the following step.

Step 730: Control a digital frequency converter to perform digital frequency conversion on the digital baseband signal in the second time unit based on the first frequency signal.

The method may be performed by a processor. For example, the processor may be the controller in the radio frequency transmitter in FIG. 5, or may be a processor in a wireless communications device equipped with the radio frequency transmitter. This is not limited in this application.

In addition, the fast switching phase-locked loop may be the fast switching phase-locked loop in FIG. 9, or may be another phase-locked loop that can implement fast switching. This is not limited in this application.

Based on the signal processing method, a modulation frequency used for up conversion in a next time unit may be determined in a time unit previous to the next time unit based on a to-be-scheduled frequency domain resource in the next time unit, and fast switching is implemented through the fast switching phase-locked loop. In a case of dynamical frequency resource scheduling in a communications system, this can implement fast switching between two adjacent time units, for example, between two adjacent slots. This can prevent a distortion signal from falling onto a guard band in the scenario of dynamic spectrum resource scheduling, and helps reduce interference caused to another user or system.

It should be understood that the foregoing has described specific processes of the foregoing steps in detail with reference to the accompanying drawings. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A radio frequency transmitter, comprising:
a digital-to-analog converter, configured to convert a digital frequency-converted signal into a first analog signal, wherein the digital frequency-converted signal is obtained by performing digital frequency conversion on a digital baseband signal based on a first frequency signal, wherein the first frequency signal is set based on an expected frequency point of a radio frequency signal, a center frequency point of the digital baseband signal, and a guard band that corresponds to a scheduled first frequency domain resource;
an analog baseband processor, configured to perform filtering and gain adjustment on the first analog signal to obtain a second analog signal; and
a modulator, configured to perform up conversion based on a second frequency signal and the second analog signal, to obtain the radio frequency signal, wherein the second frequency signal is determined based on a local frequency signal and the first frequency signal.

2. The radio frequency transmitter according to claim 1, wherein the radio frequency transmitter further comprises:
a digital baseband processor, configured to generate the digital baseband signal; and
a digital frequency converter, configured to perform the digital frequency conversion on the digital baseband signal based on the first frequency signal, to obtain the digital frequency-converted signal.

3. The radio frequency transmitter according to claim 1, wherein the radio frequency transmitter further comprises:
a controller, configured to determine the first frequency signal.

4. The radio frequency transmitter according to claim 3, wherein the controller is configured to:
when a center frequency point of a first distortion signal is a frequency of the guard band that corresponds to the scheduled first frequency domain resource, and a transmit power of the first distortion signal is greater than or equal to a preset threshold, determine the first frequency signal, to enable a second distortion signal not to cause interference to the guard band, wherein
the first distortion signal indicates nonlinear distortion caused by the digital baseband signal is being processed by the digital-to-analog converter and the analog baseband processor, and the second distortion signal indicates nonlinear distortion caused by the digital frequency-converted signal being processed by the digital-to-analog converter and the analog baseband processor.

5. The radio frequency transmitter according to claim 4, wherein the second distortion signal comprises a count third-order intermodulation ($CIM_3$) distortion signal generated based on a third-order harmonic, and a center frequency point $f_1$ of the first frequency signal satisfies:
$f_1 > (f_{RF} - f_a)/4 - f_{BB}$, or $f_1 < (f_{RF} - f_b)/4 - f_{BB}$, wherein
$f_a$ represents a minimum frequency of the guard band, $f_b$ represents a maximum frequency of the guard band, $f_{RF}$ represents the expected frequency point of the radio frequency signal, and $f_{BB}$ represents the center frequency point of the digital baseband signal.

6. The radio frequency transmitter according to claim 3, wherein the radio frequency transmitter further comprises a fast switching phase-locked loop, configured to switch from a third frequency signal to the second frequency signal, and output the second frequency signal to the modulator, wherein the third frequency signal is a frequency signal used for up conversion performed by the modulator in a previous time unit or the local frequency signal.

7. The radio frequency transmitter according to claim 6, wherein the controller is further configured to determine and output a frequency control word, wherein the frequency control word is used to control the fast switching phase-locked loop to generate the second frequency signal.

8. The radio frequency transmitter according to claim 7, wherein there is a linear relationship between the frequency control word and the first frequency signal.

9. The radio frequency transmitter according to claim 1, wherein the digital frequency-converted signal is obtained by performing up conversion on the digital baseband signal based on the first frequency signal, and the second frequency signal is a difference between a frequency of the local frequency signal and a frequency of the first frequency signal; or
the digital frequency-converted signal is obtained by performing down conversion on the digital baseband signal based on the first frequency signal, and the second frequency signal is a sum of a frequency of the local frequency signal and a frequency of the first frequency signal.

10. The radio frequency transmitter according to claim 1, wherein the local frequency signal comprises a first local frequency signal and a second local frequency signal, and the modulator comprises:
a first frequency mixer, configured to perform up conversion on the second analog signal based on the first local frequency signal to obtain a first up-converted signal; and
a second frequency mixer, configured to perform up conversion on the first up-converted signal based on the second frequency signal to obtain the radio frequency signal; wherein the second frequency signal is determined based on the second local frequency signal and the first frequency signal.

11. The radio frequency transmitter according to claim 1, wherein the local frequency signal comprises a first local frequency signal and a second local frequency signal, and the modulator comprises:
a first frequency mixer, configured to perform up conversion on the second analog signal based on the second frequency signal to obtain a second up-converted signal; and
a second frequency mixer, configured to perform up conversion on the second up-converted signal based on the second local frequency signal to obtain the radio frequency signal;
wherein the second frequency signal is determined based on the first local frequency signal and the first frequency signal.

12. A radio frequency transmitter, comprising:
a digital baseband processor, configured to generate a digital baseband signal;
a digital frequency converter, configured to perform digital frequency conversion on the digital baseband signal based on a first frequency signal to obtain a digital frequency-converted signal;
a controller, configured to: determine the first frequency signal based on an expected frequency point of a radio frequency signal, a center frequency point of the digital baseband signal, and a guard band that corresponds to a scheduled first frequency domain resource;
a digital-to-analog converter, configured to convert the digital frequency-converted signal into a first analog signal;
an analog baseband processor, configured to perform filtering and gain adjustment on the first analog signal to obtain a second analog signal;
a modulator, configured to perform up conversion on the second analog signal based on a second frequency signal to obtain the radio frequency signal; and
a fast switching phase-locked loop, configured to switch from a third frequency signal to the second frequency signal, wherein the third frequency signal is a frequency signal used by the modulator for up conversion in a previous time unit or a local frequency signal.

13. The radio frequency transmitter according to claim 12, wherein the fast switching phase-locked loop comprises: a phase detector, a loop filter, a controlled oscillator, a feedback frequency divider, and a frequency switching controller, wherein the frequency switching controller is configured to generate a first signal, wherein the first signal is used to adjust a frequency division ratio of the feedback frequency divider;

the feedback frequency divider is configured to obtain a feedback signal from an oscillation signal output by the controlled oscillator, and perform frequency division processing on the feedback signal under control of the first signal, to obtain a frequency-divided signal;

the phase detector is configured to compare the frequency-divided signal with a reference signal, to output a control signal;

the loop filter is configured to perform filtering processing on the control signal, and output the control signal on which the filtering processing has been performed;

the frequency switching controller is further configured to generate a second signal, wherein the second signal is used to control the controlled oscillator to perform frequency switching; and the controlled oscillator is configured to generate the second frequency signal under control of the second signal and the control signal on which the filtering processing has been performed.

14. The radio frequency transmitter according to claim 13, wherein the frequency switching controller comprises:

a sigma-delta modulator, configured to generate the first signal based on a frequency control word; and a gain compensation circuit, configured to generate the second signal based on a gain of the controlled oscillator and an expected frequency switching value, wherein the frequency switching value is a difference between a frequency of the second frequency signal and a frequency of the third frequency signal.

15. A signal processing method, comprising:

receiving resource scheduling information in a first time unit, wherein the resource scheduling information is used to indicate a first frequency domain resource to be scheduled in a second time unit, and the second time unit is a next time unit of the first time unit; and based on an expected frequency point of a radio frequency signal, a center frequency point of a digital baseband signal, and a guard band that corresponds to the first frequency domain resource, determining a frequency control word and sending the frequency control word to a fast switching phase-locked loop, wherein the frequency control word is used to control the fast switching phase-locked loop to switch from a third frequency signal to a second frequency signal, the second frequency signal is used to perform up conversion on an analog signal in the second time unit, and the third frequency signal is a signal used to perform up conversion on the analog signal in the first time unit, or the third frequency signal is a local frequency signal.

16. The method according to claim 15, wherein the method further comprises:

determining a first frequency signal based on the expected frequency point of the radio frequency signal, the center frequency point of the digital baseband signal, and the guard band that corresponds to the first frequency domain resource; and wherein determining the frequency control word and sending the frequency control word to the fast switching phase-locked loop comprises:

based on the first frequency signal, determining the frequency control word and sending the frequency control word to the fast switching phase-locked loop.

17. The method according to claim 16, wherein the method further comprises:

controlling a digital frequency converter to perform digital frequency conversion on the digital baseband signal in the second time unit based on the first frequency signal.

* * * * *